US010884580B2

(12) United States Patent
Foster et al.

(10) Patent No.: US 10,884,580 B2
(45) Date of Patent: Jan. 5, 2021

(54) DEVICES AND METHODS FOR DISPLAYING CONTENT IN A NOTE-TAKING APPLICATION

(71) Applicant: Apple Inc., Cupertino, CA (US)

(72) Inventors: J. Gabriel Foster, Cupertino, CA (US); Charles J. Migos, San Bruno, CA (US); Gustaf Engstrom, San Francisco, CA (US); Markus Hagele, San Francisco, CA (US); Michael D. Trent, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 620 days.

(21) Appl. No.: 14/872,090

(22) Filed: Sep. 30, 2015

(65) Prior Publication Data

US 2016/0357367 A1 Dec. 8, 2016

Related U.S. Application Data

(60) Provisional application No. 62/172,164, filed on Jun. 7, 2015.

(51) Int. Cl.
*G06F 3/0482* (2013.01)
*G06F 3/0488* (2013.01)
*G06F 3/0484* (2013.01)

(52) U.S. Cl.
CPC .......... *G06F 3/0482* (2013.01); *G06F 3/0488* (2013.01); *G06F 3/04842* (2013.01); *G06F 3/04886* (2013.01)

(58) Field of Classification Search
CPC .... G06Q 10/10; G06A 10/109; G06F 3/0482; G06F 3/04886; G06F 3/0488; G06F 3/04842
See application file for complete search history.

(56) References Cited

U.S. PATENT DOCUMENTS

| 7,783,708 B2 | 8/2010 | Zaner-Godsey et al. |
| 8,103,949 B2 | 1/2012 | Moore et al. |

(Continued)

FOREIGN PATENT DOCUMENTS

| EP | 2 717 128 A1 | 4/2014 |
| EP | 2 757 455 A1 | 7/2014 |

OTHER PUBLICATIONS

AndroidTabletApps, Springpad on Android Tablet, Sep. 7, 2011, Youtube.com, www.youtube.com/watch?v=NgQ48h7iGpw, pp. 1-11. (Year: 2011).*

(Continued)

*Primary Examiner* — Daniel W Parcher
(74) *Attorney, Agent, or Firm* — Morgan, Lewis & Bockius LLP

(57) ABSTRACT

An electronic device with a display and a note-taking application: displays, on the display, a first user interface of the note-taking application, wherein: the note-taking application includes a plurality of notes prepared by a user; the plurality of notes includes electronic text content input by the user, and content created and/or selected by the user that is distinct from the electronic text content; the content created and/or selected includes content from a plurality of distinct content categories; and the first user interface displays a categorized-content-view affordance; detects activation of the categorized-content-view affordance; and, in response to detecting activation of the categorized-content-view affordance, displays, in a categorized-content view, a scrollable list of at least some of the content created and/or selected by the user that is distinct from the electronic text content input by the user, wherein the content in the scrollable list is organized and displayed by the content categories.

33 Claims, 31 Drawing Sheets

(56) References Cited

U.S. PATENT DOCUMENTS

| | | |
|---|---|---|
| 2005/0289133 A1 | 12/2005 | Arrouye et al. |
| 2005/0289140 A1* | 12/2005 | Ford .................. G06F 17/30705 |
| 2006/0173961 A1* | 8/2006 | Turski .................. G06Q 10/107 |
| | | 709/206 |
| 2006/0277492 A1* | 12/2006 | Matthews ............. G06F 9/4443 |
| | | 715/789 |
| 2008/0010610 A1 | 1/2008 | Lim et al. |
| 2008/0034381 A1* | 2/2008 | Jalon .................... G06F 16/168 |
| | | 719/329 |
| 2008/0172663 A1* | 7/2008 | Lee ......................... H04L 51/38 |
| | | 717/173 |
| 2010/0060573 A1 | 3/2010 | Moussavi |
| 2010/0205559 A1 | 8/2010 | Rose |
| 2011/0310118 A1 | 12/2011 | Asmi et al. |
| 2012/0111936 A1* | 5/2012 | Brown .................. G06Q 10/10 |
| | | 235/375 |
| 2012/0290945 A1* | 11/2012 | Byrne .................... G06Q 50/32 |
| | | 715/752 |
| 2013/0022330 A1* | 1/2013 | Carter ............. H04N 21/41407 |
| | | 386/224 |
| 2013/0139113 A1 | 5/2013 | Choudhary et al. |
| 2014/0173521 A1 | 6/2014 | Mayor |
| 2014/0204126 A1 | 7/2014 | Mankowski et al. |
| 2014/0247383 A1* | 9/2014 | Dave .................. H04N 5/23293 |
| | | 348/333.02 |
| 2014/0372877 A1* | 12/2014 | Snyder .................. G06F 17/212 |
| | | 715/254 |
| 2015/0040065 A1 | 2/2015 | Bianco et al. |

OTHER PUBLICATIONS

Bombchelle, How to use Springpad to manage tasks + projects, Aug. 9, 2011, Youtube.com, www.youtube.com/watch?v=0Rg3C8Mxr8Q, pp. 1-4. (Year: 2011).*

Wikipedia, "Evernote", http://en.wilipedia.org/wili/Evernote, Jun. 24, 2008, 7 pages.

Wikipedia, "Google Keep", http://en.wikipedia.org/wili/Google_Keep, Mar. 20, 2013, 6 pages.

Wikipedia, "Microsoft OneNote", Nov. 19, 2003, http://en.wikipedia.org/wiki/Microsoft_OneNote, 6 pages.

Wikipedia, Notes (Apple), http://en.wikipedia.org/wiki/Notes_(application), Feb. 2, 2018, 4 pages.

* cited by examiner

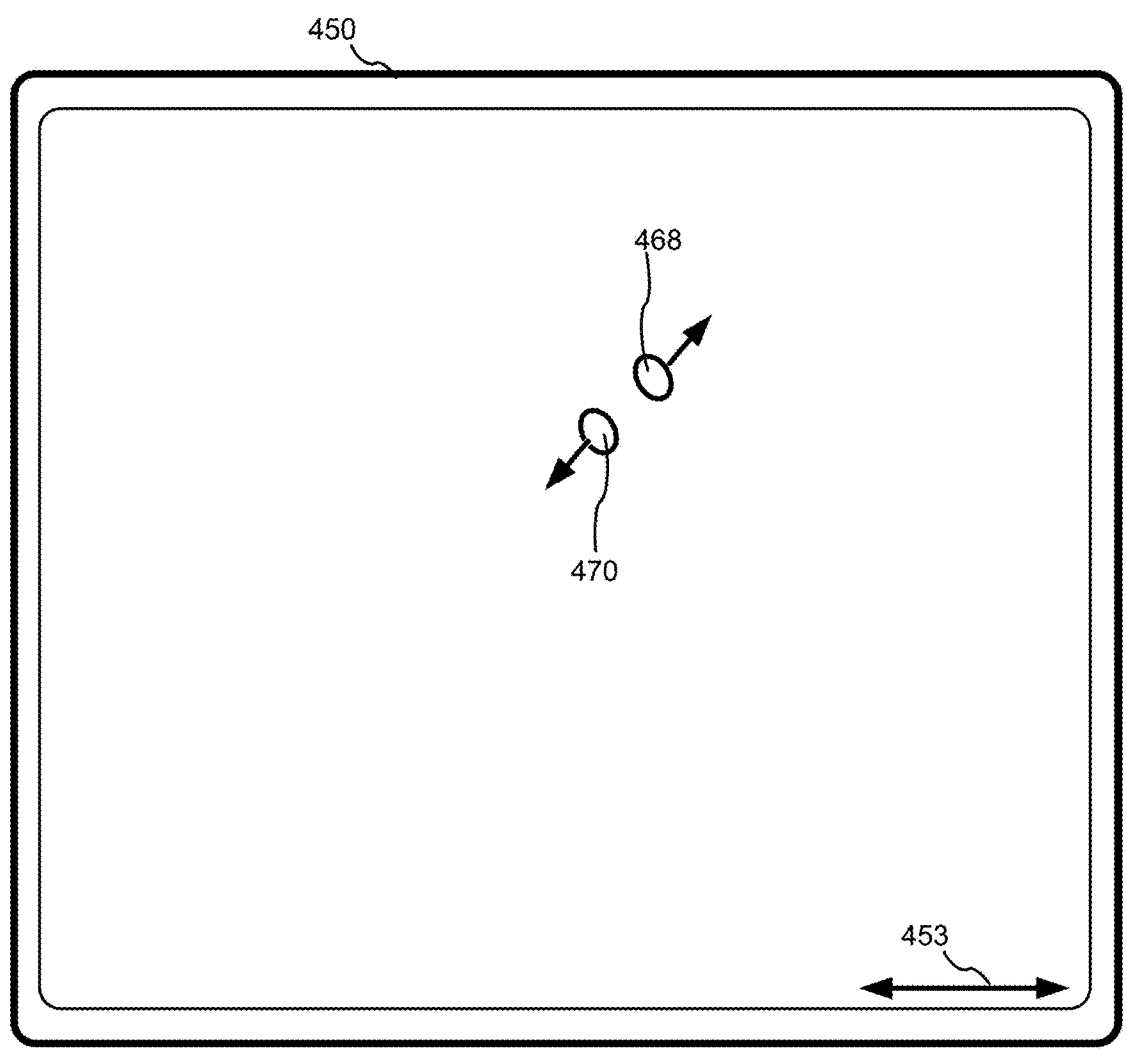
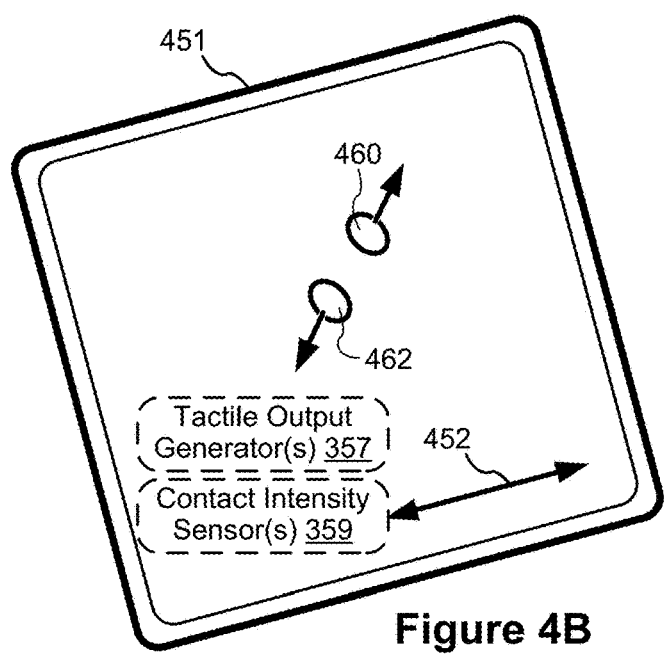
Figure 4B

700

702 Display, on the display, a first user interface of the note-taking application, wherein:
    the note-taking application includes a plurality of notes prepared by a user;
    the plurality of notes prepared by the user includes
        electronic text content input by the user, and
        content created and/or selected by the user that is distinct from the electronic text content input by the user;
    the content created and/or selected by the user includes content from a plurality of distinct content categories; and
    the first user interface displays a categorized-content-view affordance > 704 The first user interface concurrently displays, with the categorized-content-view affordance, a first note prepared by the user of the electronic device
>
>> 706 The first user interface concurrently displays the categorized-content-view affordance and the first note without displaying other notes prepared by the user in the note-taking application

708 Detect activation of the categorized-content-view affordance

710 In response to detecting activation of the categorized-content-view affordance, display, in a categorized-content view, a scrollable list of at least some of the content created and/or selected by the user that is distinct from the electronic text content input by the user, wherein the content in the scrollable list is organized and displayed by the content categories > 712 The content categories in the scrollable list include hand-drawn sketches created by the user (A)

Figure 7A

710 In response to detecting activation of the categorized-content-view affordance, display, in a categorized-content view, a scrollable list of at least some of the content created and/or selected by the user that is distinct from the electronic text content input by the user, wherein the content in the scrollable list is organized and displayed by the content categories (A)

714 The categorized-content view displays, for a respective content category,
   a predefined number of content items in the respective content category, and
   an affordance for the respective content category that when activated results in the display of additional content items in the respective content category 716 The predefined number of content items in the respective content category are configured to be concurrently displayed on the display at a same time 718 The predefined number of content items in the respective content category and the affordance for the respective content category are configured to be concurrently displayed on the display at a same time 720 The content items displayed as part of the predefined number of content items in the respective content category correspond to the most recent content items created and/or selected by the user in the respective content category 722 The content items displayed as part of the predefined number of content items in the respective content category correspond to the most recently displayed content items in the respective content category (B)   (C)

Figure 7B

724 Detect an input on a first content item in the scrollable list of content, wherein the first content item is associated with a first note that also contains first electronic text content input by the user;
    in accordance with a determination that the input is a first type of input, enlarge the first content item without displaying the first note; and,
    in accordance with a determination that the input is a second type of input, distinct from the first type of input, display the first note

726 Detect an input on a first content item in the scrollable list of content, wherein the first content item is associated with a first note that also contains first electronic text content input by the user;
    in accordance with a determination that the input is a first type of input, enlarge the first content item without displaying the first note; and,
    in accordance with a determination that the input is a second type of input, distinct from the first type of input, display a menu with selectable actions for the first content item

DEVICES AND METHODS FOR DISPLAYING CONTENT IN A NOTE-TAKING APPLICATION

RELATED APPLICATION

This application claims priority to U.S. Provisional Application Ser. No. 62/172,164, filed Jun. 7, 2015, which is incorporated herein by reference in its entirety.

TECHNICAL FIELD

This relates generally to electronic devices with touch-sensitive surfaces, including but not limited to electronic devices with touch-sensitive surfaces that display content in a note-taking application.

BACKGROUND

Many electronic devices have a note-taking application (e.g., Notes from Apple Inc. of Cupertino, Calif.) that allows a user to input electronic text (e.g., via a keyboard and/or voice dictation), as well as input content created and/or selected by the user that is distinct from the electronic text. Exemplary content created and/or selected by the user that is distinct from the electronic text input by the user includes content such as photos, videos, maps, websites, and the like. A user will, in some circumstances, need to find such content or a corresponding note that contains such content in the note-taking application.

However, methods for finding such content and/or finding a corresponding note that contains such content are cumbersome and inefficient. For example, opening each note in the note-taking application to find the desired content is tedious. Similarly, entering search terms and performing a search is time-consuming and may not result in finding the desired content. In addition, these methods take longer than necessary, thereby wasting energy. This latter consideration is particularly important in battery-operated devices.

SUMMARY

Accordingly, there is a need for electronic devices with faster, more efficient methods and interfaces for displaying content in a note-taking application. Such methods and interfaces optionally complement or replace conventional methods for displaying content in a note-taking application. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, in addition to note taking, the functions optionally include image editing, drawing, presenting, word processing, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a note-taking application. The method includes: displaying, on the display, a first user interface of the note-taking application, wherein: the note-taking application includes a plurality of notes prepared by a user; the plurality of notes prepared by the user includes electronic text content input by the user, and content created and/or selected by the user that is distinct from the electronic text content input by the user; the content created and/or selected by the user includes content from a plurality of distinct content categories; and the first user interface displays a categorized-content-view affordance; detecting activation of the categorized-content-view affordance; and, in response to detecting activation of the categorized-content-view affordance, displaying, in a categorized-content view, a scrollable list of at least some of the content created and/or selected by the user that is distinct from the electronic text content input by the user, wherein the content in the scrollable list is organized and displayed by the content categories.

In accordance with some embodiments, an electronic device includes a display unit configured to display a user interface, a note-taking application unit configured to take notes, and a processing unit coupled with the display unit and the note-taking application unit. The processing unit is configured to: enable display of, on the display unit, a first user interface of the note-taking application unit, wherein: the note-taking application unit includes a plurality of notes prepared by a user; the plurality of notes prepared by the user includes electronic text content input by the user, and content created and/or selected by the user that is distinct from the electronic text content input by the user; the content created and/or selected by the user includes content from a plurality of distinct content categories; and the first user interface displays a categorized-content-view affordance; detect activation of the categorized-content-view affordance; and, in response to detecting activation of the categorized-content-view affordance, enable display of, in a categorized-content view, a scrollable list of at least some of the content created and/or selected by the user that is distinct from the electronic text content input by the user, wherein the content in the scrollable list is organized and displayed by the content categories.

In accordance with some embodiments, an electronic device includes a display, a note-taking application, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display and a note-taking application, cause the device to perform or cause performance of the operations of any of the methods described herein. In accordance with some embodiments, a graphical user interface on an electronic device with a display, a note-taking application, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a note-taking application, and means for performing or causing performance of the operations of any of the methods described herein. In accordance with some embodiments, an information processing apparatus, for use in an electronic device with a display and a note-taking application, includes means for performing or causing performance of the operations of any of the methods described herein.

Thus, electronic devices with displays and note-taking applications are provided with faster, more efficient methods and interfaces for displaying content in a note-taking application, thereby increasing the effectiveness, efficiency, and user satisfaction with such devices. Such methods and interfaces may complement or replace conventional methods for displaying content in a note-taking application.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7C are flow diagrams illustrating a method of displaying content in a note-taking application in accordance with some embodiments.

DESCRIPTION OF EMBODIMENTS

Figure 1A:
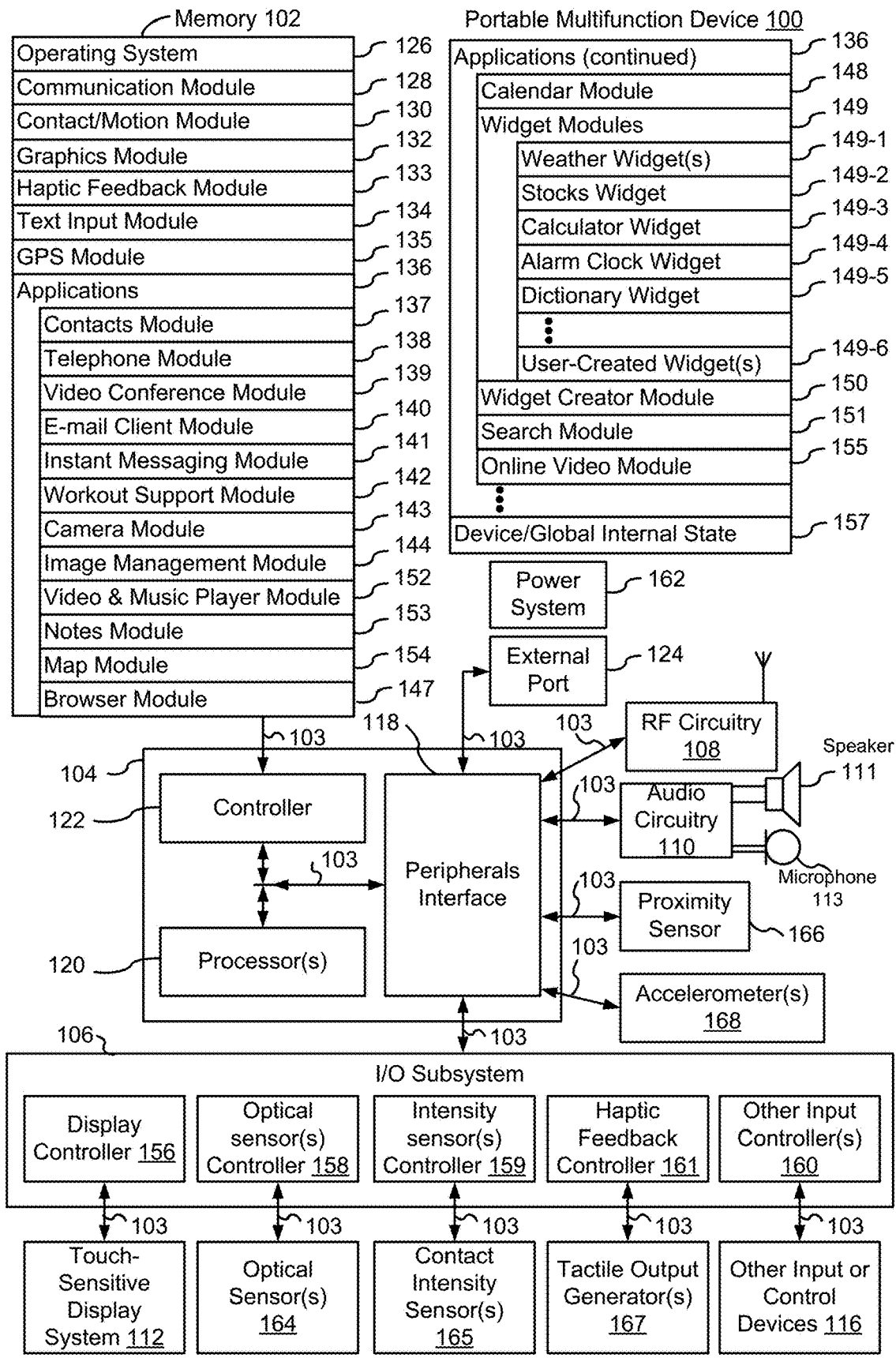
FIG. 1A is a block diagram illustrating a portable multifunction device with a touch-sensitive display in accordance with some embodiments.

Many electronic devices have a note-taking application that allows a user to input electronic text (e.g., via a keyboard and/or voice dictation). In addition, some note-taking applications allow a user to add to a note content created and/or selected by the user that is distinct from the electronic text input by the user. For example, a user can add photos, videos, maps, websites, and/or user sketches to a note. However, existing methods for finding such content and/or finding a corresponding note that contains such are slow and inefficient. For example, the user may need to open each note until the note with the desired content is found. Alternatively, the user may need to enter search terms and perform a search. The embodiments below address this problem by providing a categorized-content view with a scrollable list of at least some of the content created and/or selected by the user that is distinct from the electronic text input by the user, where the content in the scrollable list is organized and displayed by the content categories. The categorized-content view provides a fast way to find content and/or find a corresponding note without having to open individual notes or enter search terms and perform a search.

Below, FIGS. 1A-1B, 2, 3, 4A-4B, and 5A-5D provide a description of exemplary devices. FIGS. 6A-6N illustrate exemplary user interfaces for displaying content in a note-taking application. FIGS. 7A-7C are flow diagrams illustrating a method of displaying content in a note-taking application. The user interfaces in FIGS. 6A-6N are used to illustrate the processes in FIGS. 7A-7C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note-taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
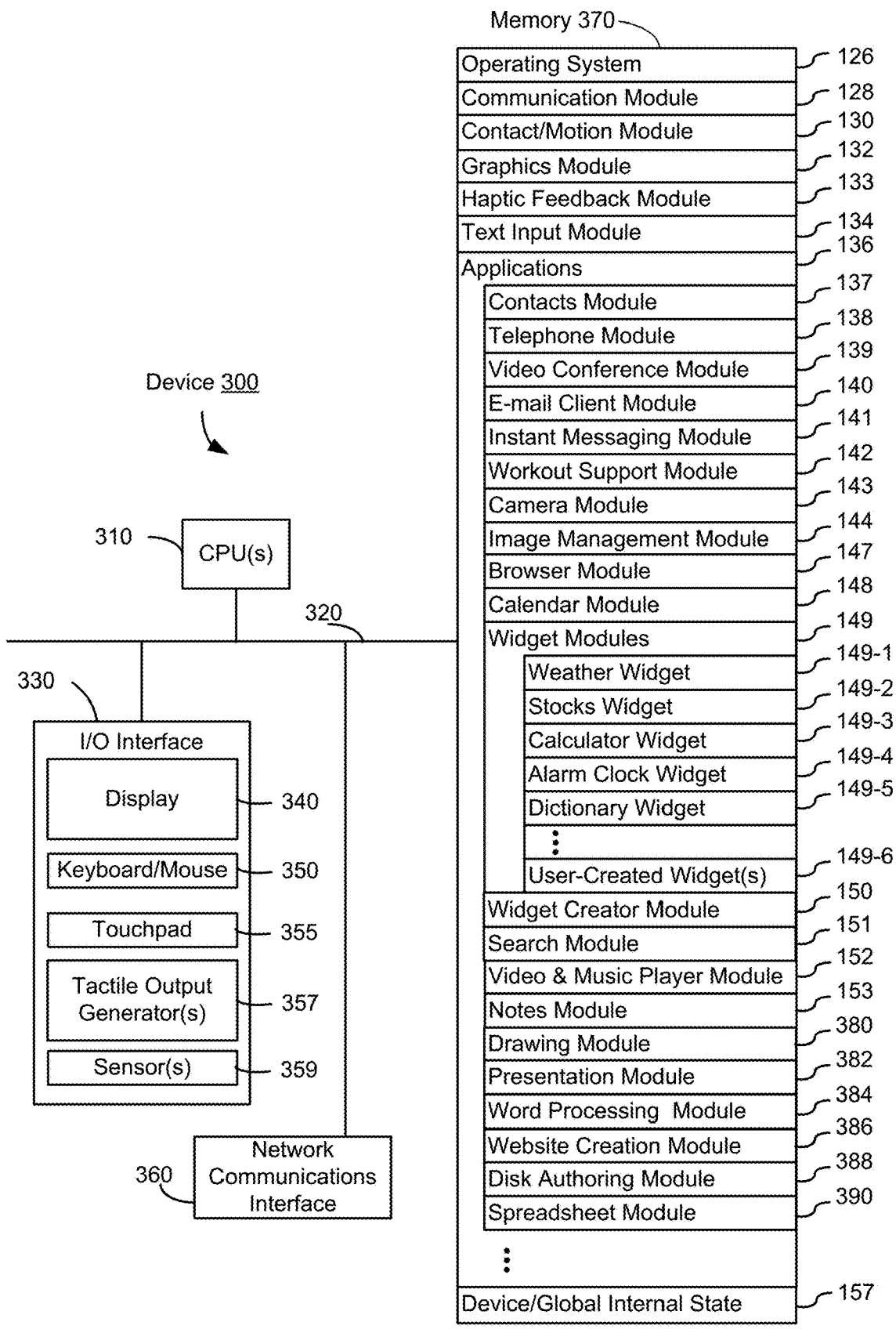
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graph-ics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or
 online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
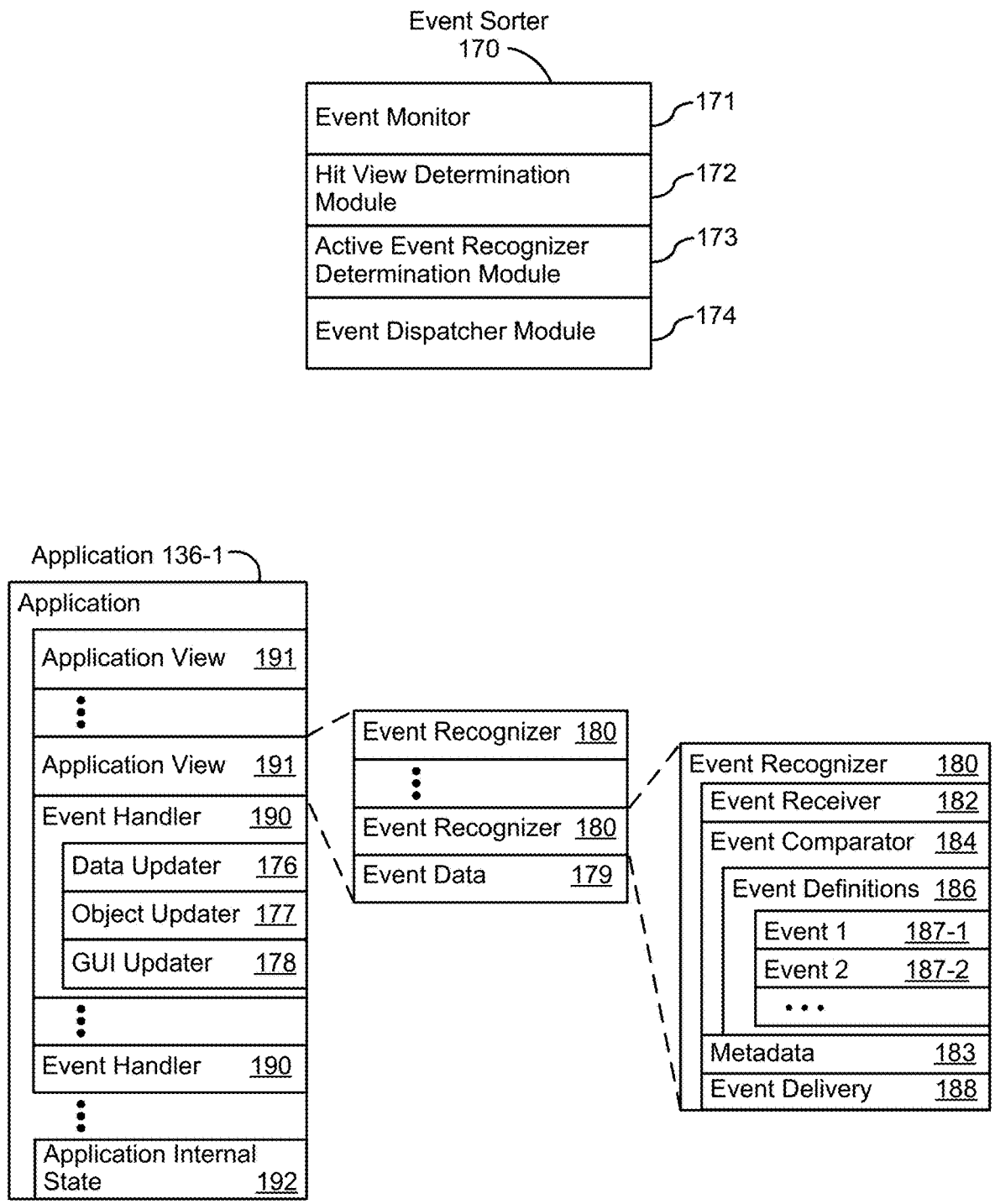
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
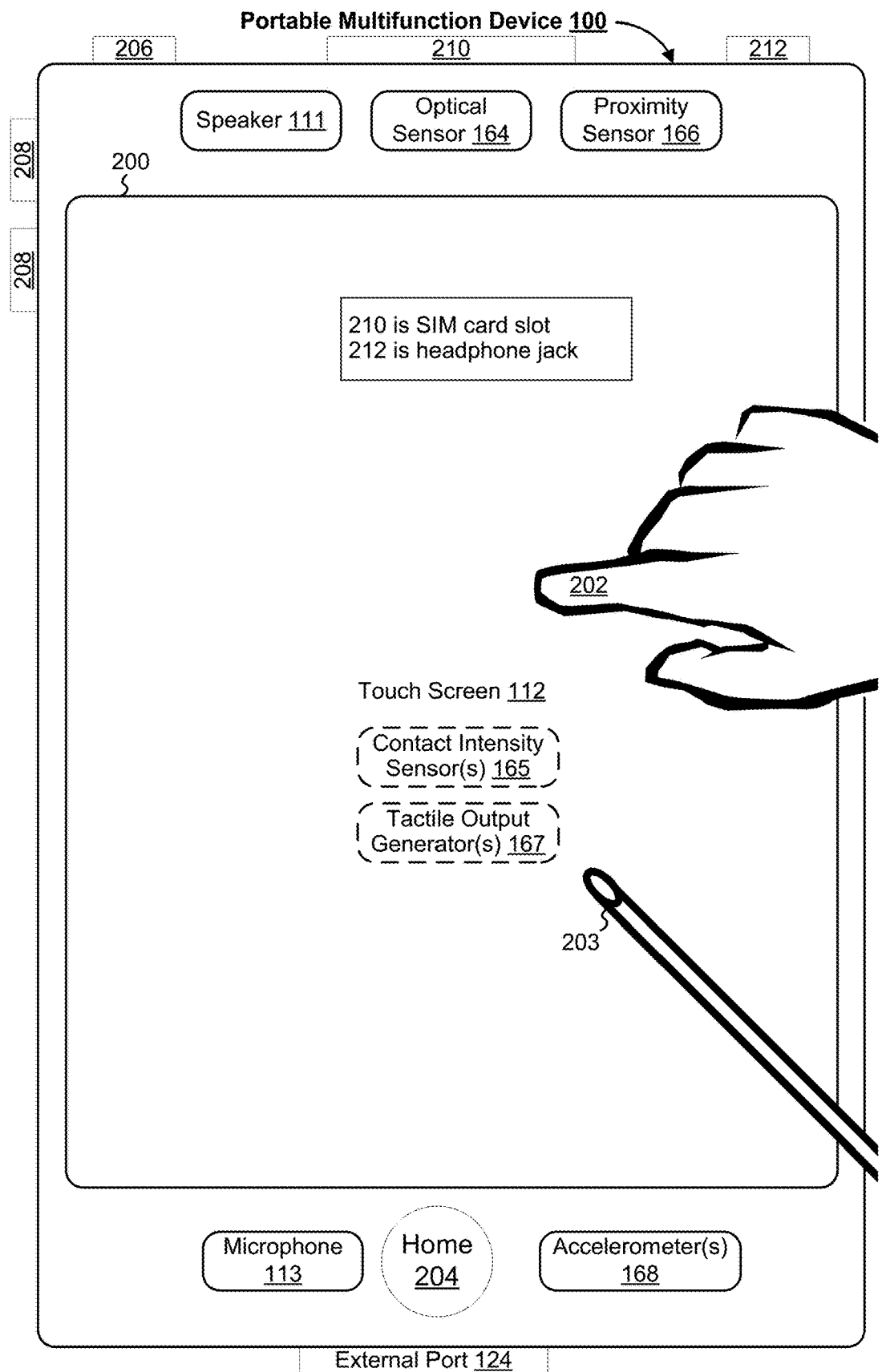
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
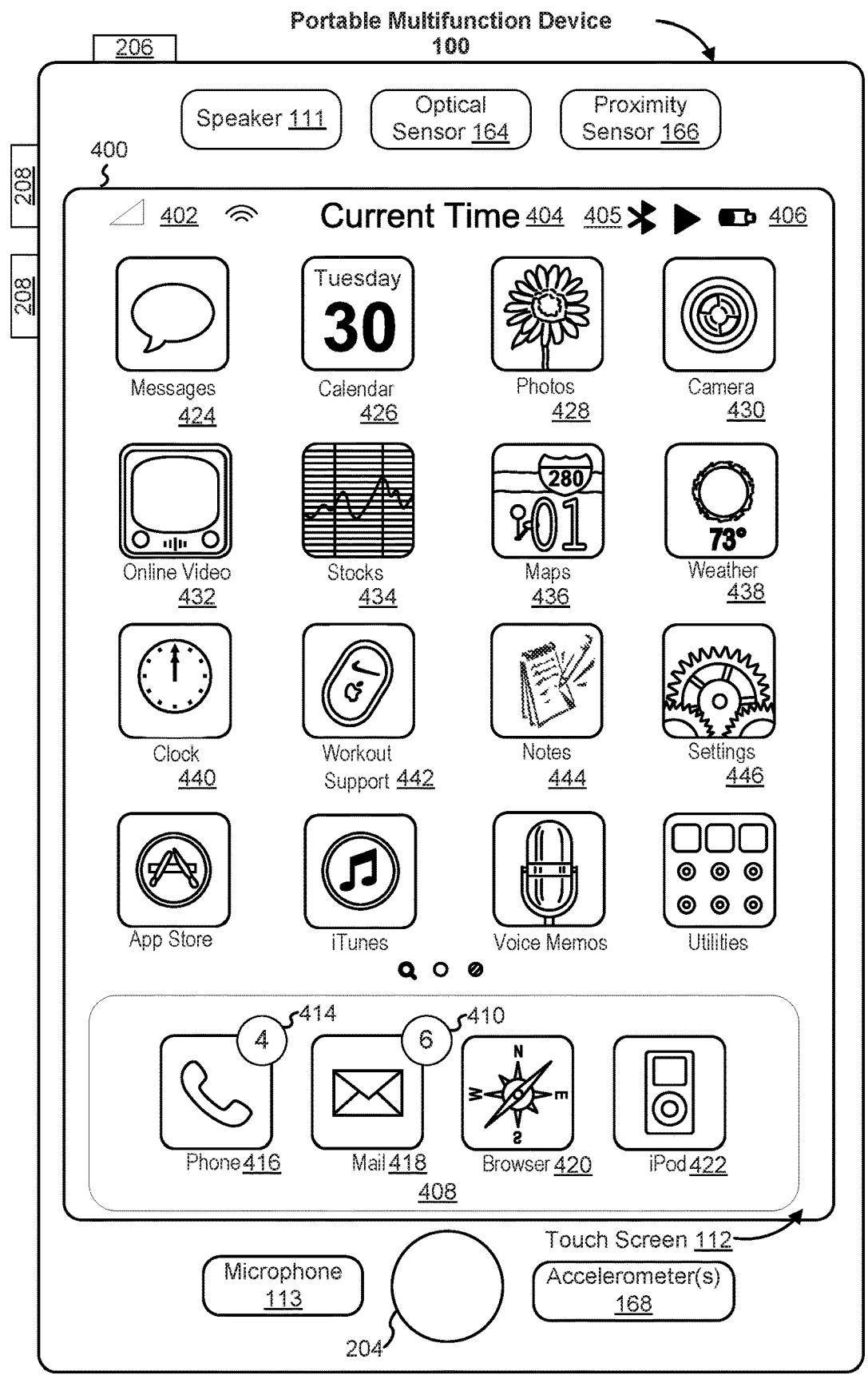
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Figure 5A:
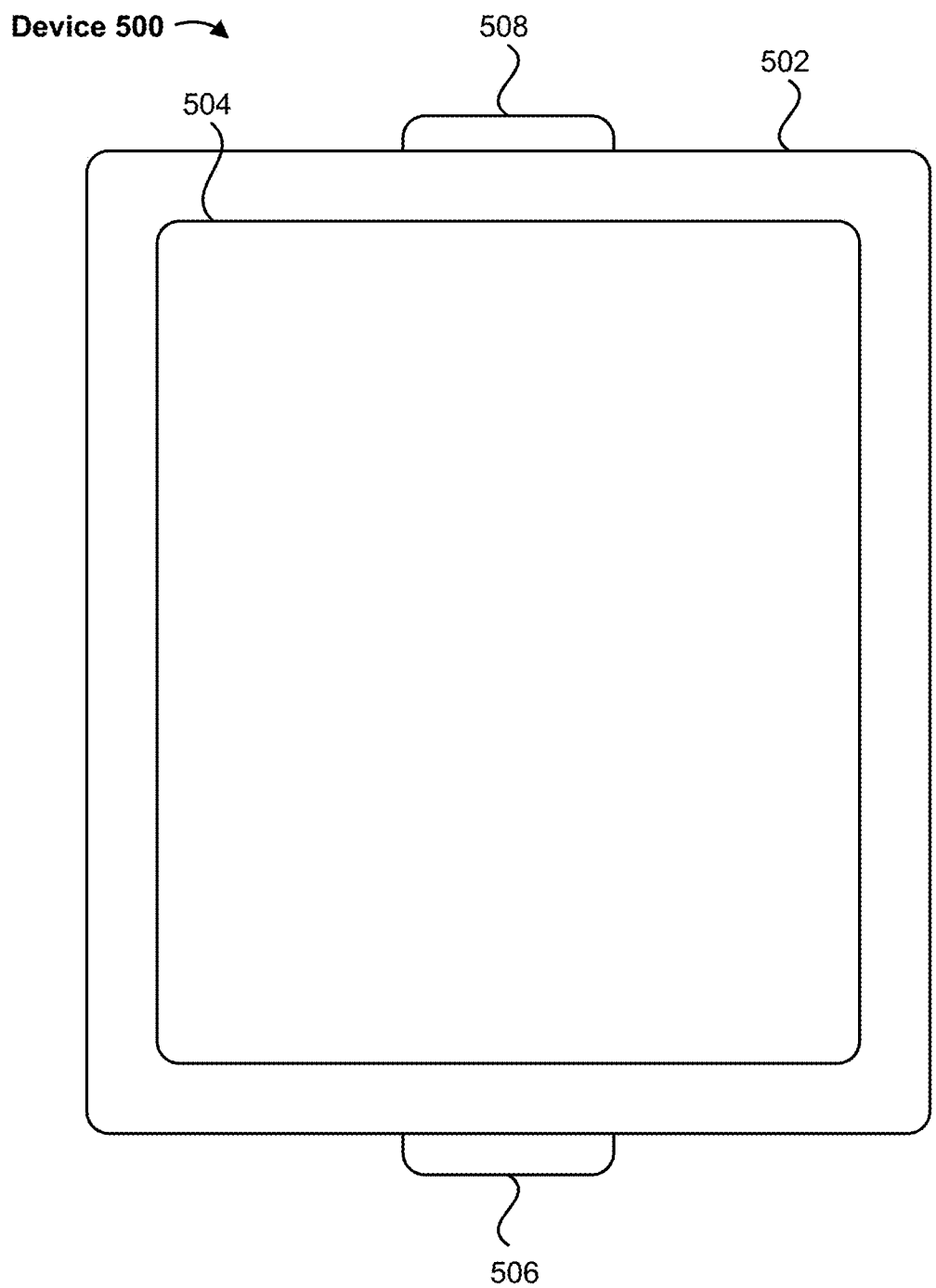
FIG. 5A illustrates a personal electronic device in accordance with some embodiments.
Figure 6A:
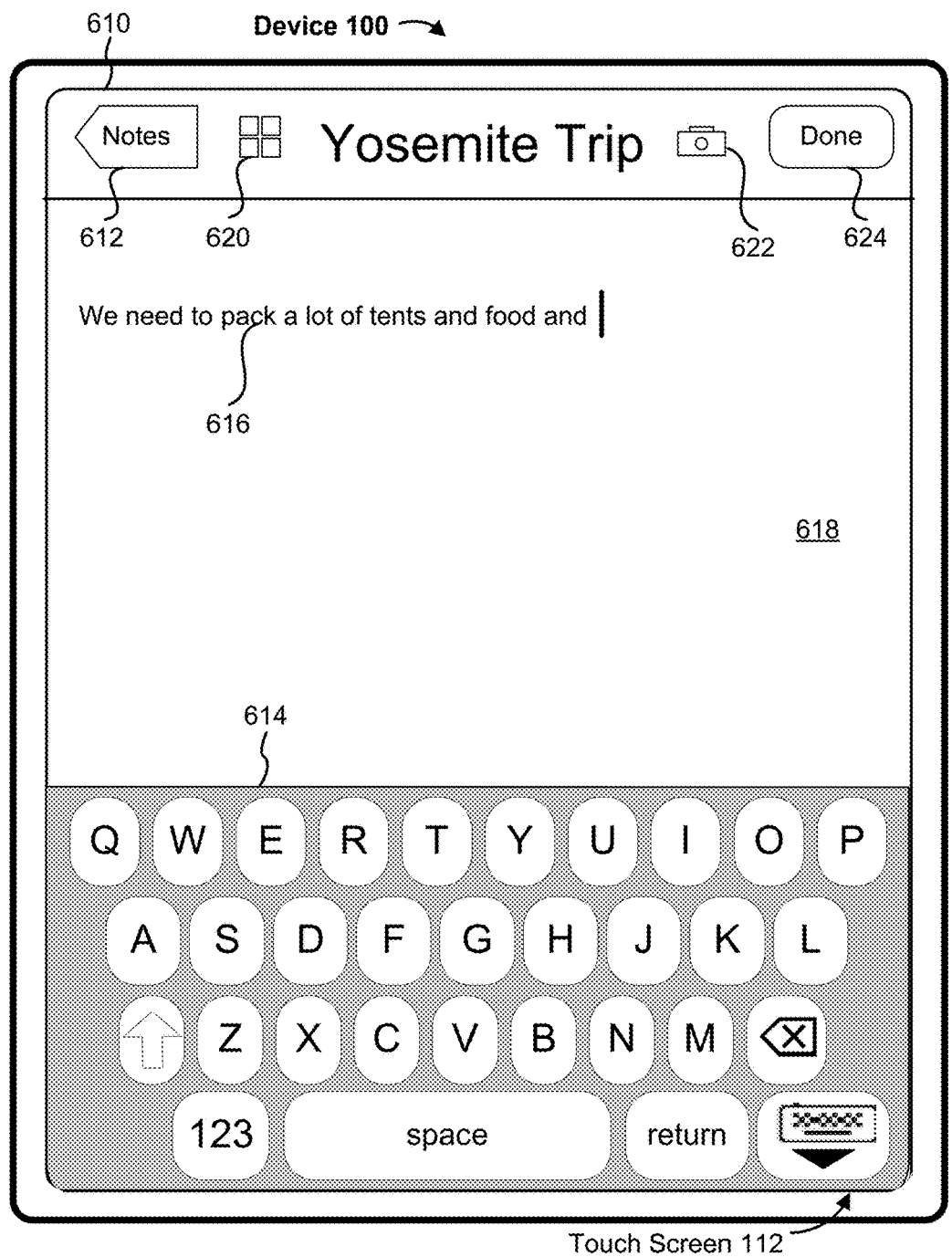
FIGS. 6A-6N illustrate exemplary user interfaces for displaying content in a note-taking application in accordance with some embodiments.

FIG. 5A illustrates exemplary personal electronic device 500. Device 500 includes body 502. In some embodiments, device 500 has touch-sensitive display screen 504. Alternatively, or in addition to touch screen 504, device 500 has a display and a touch-sensitive surface. In some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

In some embodiments, regardless of whether touch screen 504 (or the touch-sensitive surface) has the above-described intensity sensors, device 500 can optionally communicate with a stylus having a pressure-sensitive tip that detects and provides data regarding the intensity of the stylus's touch on device 500, particularly touch screen 504.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
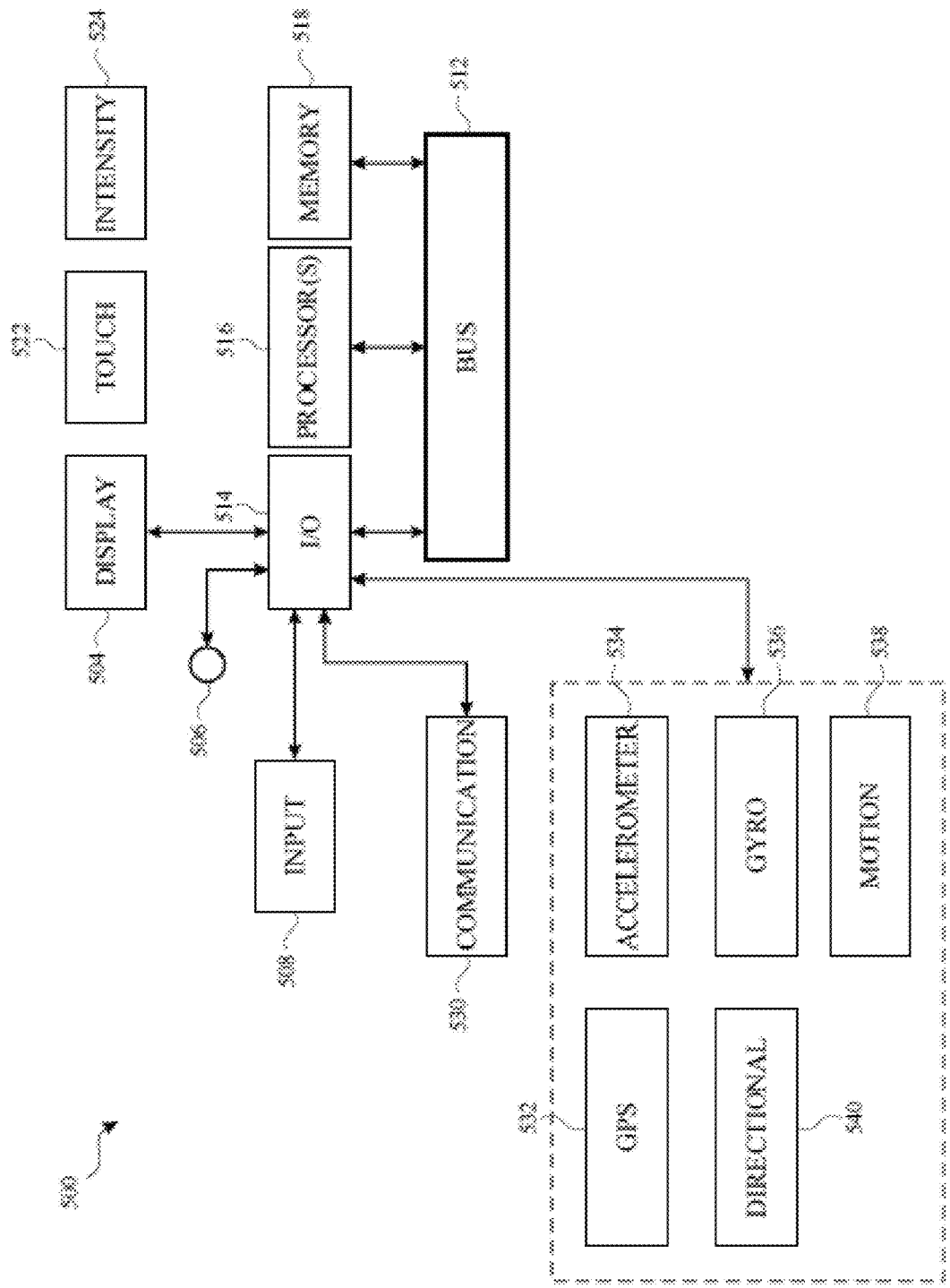
FIG. 5B is a block diagram illustrating a personal electronic device in accordance with some embodiments.

FIG. 5B depicts exemplary personal electronic device 500. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication ("NFC"), cellular and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Computing device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of computing device 500 can be a non-transitory computer readable storage medium, for storing computer-executable instructions, which, when executed by one or more computer processors 516, for example, can cause the computer processors to perform the techniques described herein, including the processes of FIGS. 7A-7C. The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. It should be appreciated that device 500 is only one example of a personal electronic device, and that device 500 optionally has more or fewer components than shown, optionally combines two or more components, or optionally has a different configuration or arrangement of the components. The various components shown in FIG. 5B are implemented in hardware, software, firmware, or a combination thereof, including one or more signal processing and/or application specific integrated circuits.

Figure 5C:
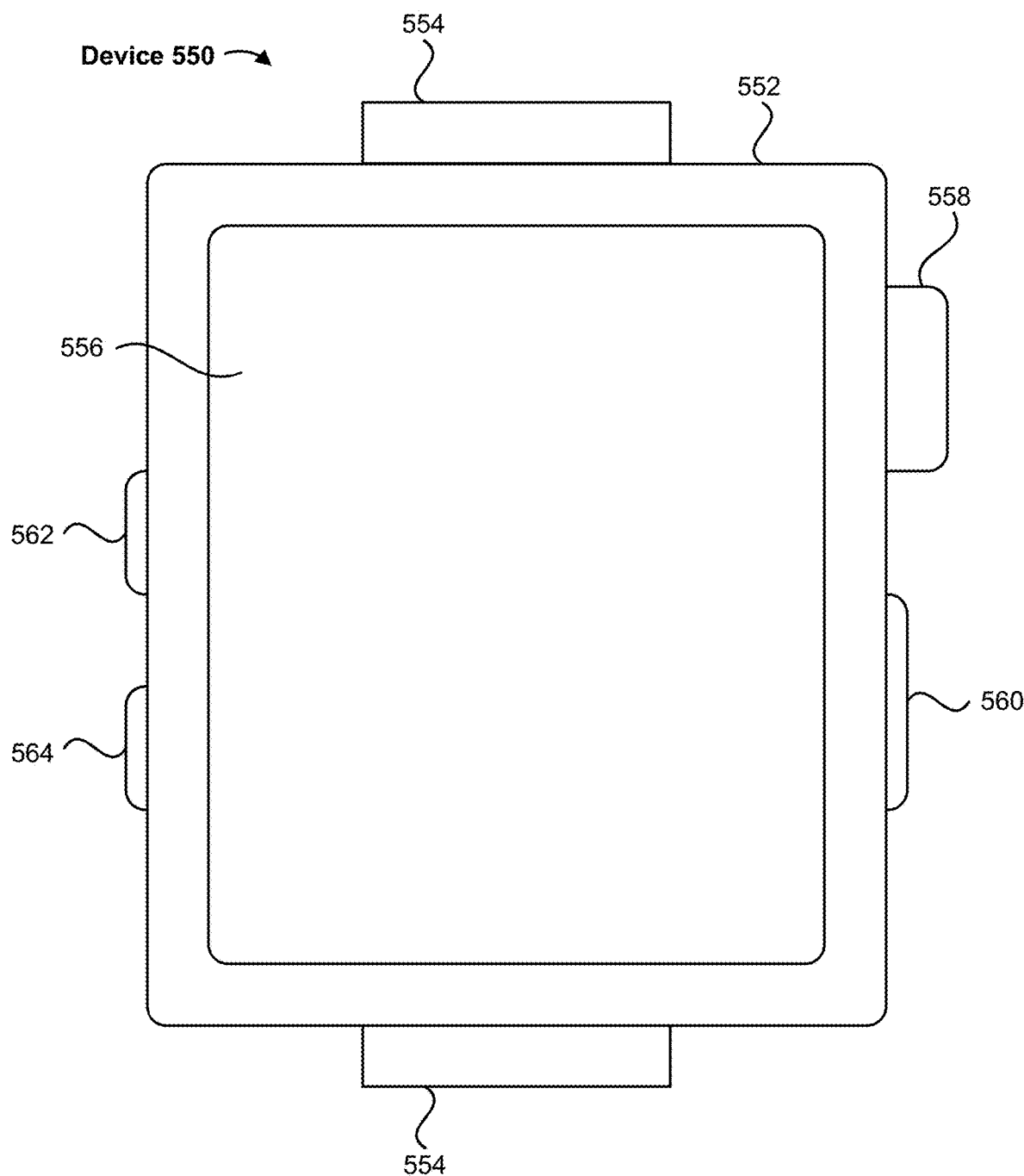
FIG. 5C illustrates an exemplary wearable electronic device in accordance with some embodiments.

FIG. 5C illustrates exemplary personal electronic device 550. In the illustrated example, device 550 is a watch that generally includes body 552 and strap 554 for affixing device 550 to the body of a user. That is, device 550 is wearable. Body 552 can designed to couple with straps 554. Device 550 can have touch-sensitive display screen (also known as a "touch screen" or "touch-screen display" or simply "display") 556 and crown 558. Device 550 can also have buttons 560, 562, and 564.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 558 can be mechanical, meaning that it can be connected to a sensor for converting physical movement of the crown into electrical signals. Crown 558 can rotate in two directions of rotation (e.g., forward and backward). Crown 558 can also be pushed in towards the body of device 550 and/or be pulled away from device 550. Crown 558 can be touch-sensitive, for example, using capacitive touch technologies that can detect whether a user is touching the crown. Moreover, crown 558 can further be rocked in one or more directions or translated along a track along an edge or at least partially around a perimeter of body 552. In some examples, more than one crown 558 can be used. The visual appearance of crown 558 can, but need not, resemble crowns of conventional watches. Buttons 560, 562, and 564, if included, can each be a physical or a touch-sensitive button. That is, the buttons may be, for example, physical buttons or capacitive buttons. Further, body 552, which can include a bezel, may have predetermined regions on the bezel that act as buttons.

Display 556 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 556 can allow a user to perform various functions by touching over hovering near the touch sensor panel using one or more fingers or other object.

In some examples, device 550 can further include one or more pressure sensors (not shown) for detecting a force or pressure applied to the display. The force or pressure applied to display 556 can be used as an input to device 550 to perform any desired operation, such as making a selection, entering or exiting a menu, causing the display of additional options/actions, or the like. In some examples, different operations can be performed based on the amount of force or pressure being applied to display 556. The one or more pressure sensors can further be used to determine a position that the force is being applied to display 556.

Figure 5D:
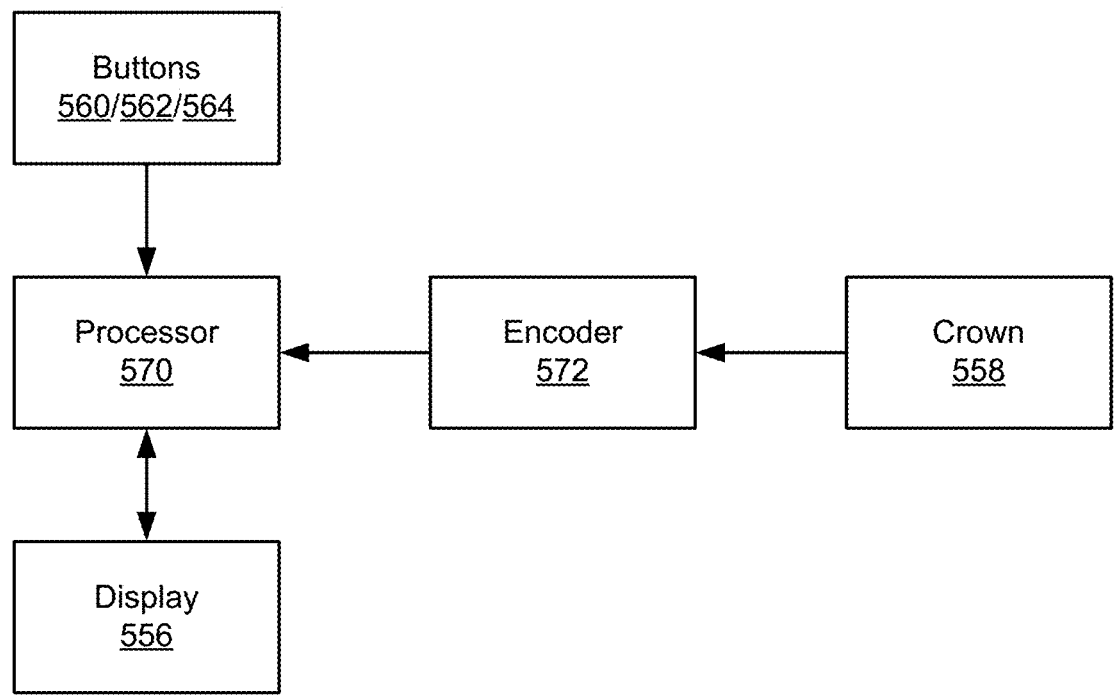
FIG. 5D illustrates a block diagram of an exemplary wearable electronic device in accordance with some embodiments.

FIG. 5D illustrates a block diagram of some of the components of device 550. As shown, crown 558 can be coupled to encoder 572, which can be configured to monitor a physical state or change of state of crown 558 (e.g., the position of the crown), convert it to an electrical signal (e.g., convert it to an analog or digital signal representation of the position or change in position of crown 558), and provide the signal to processor 570. For instance, in some examples, encoder 572 can be configured to sense the absolute rotational position (e.g., an angle between 0-360°) of crown 558 and output an analog or digital representation of this position to processor 570. Alternatively, in other examples, encoder 572 can be configured to sense a change in rotational position (e.g., a change in rotational angle) of crown 558 over some sampling period and to output an analog or digital representation of the sensed change to processor 570. In these examples, the crown position information can further indicate a direction of rotation of the crown (e.g., a positive value can correspond to one direction and a negative value can correspond to the other). In yet other examples, encoder 572 can be configured to detect a rotation of crown 558 in any desired manner (e.g., velocity, acceleration, or the like) and can provide the crown rotational information to processor 570. In alternative examples, instead of providing information to processor 570, this information can be provided to other components of device 550. While the examples described herein refer to the use of rotational position of crown 558 to control scrolling, scaling, or an objects position, it should be appreciated that any other physical state of crown 558 can be used.

In some examples, the physical state of the crown can control physical attributes of display 556. For example, if crown 558 is in a particular position (e.g., rotated forward), display 556 can have limited z-axis traversal ability. In other words, the physical state of the crown can represent physical modal functionality of display 556. In some examples, a temporal attribute of the physical state of crown 558 can be used as an input to device 550. For example, a fast change in physical state can be interpreted differently than a slow change in physical state.

Processor 570 can be further coupled to receive input signals from buttons 560, 562, and 564, along with touch signals from touch-sensitive display 556. The buttons may be, for example, physical buttons or capacitive buttons. Further, body 552, which can include a bezel, may have predetermined regions on the bezel that act as buttons. Processor 570 can be configured to interpret these input signals and output appropriate display signals to cause an image to be produced by touch-sensitive display 556. While a single processor 570 is shown, it should be appreciated that any number of processors or other computational devices can be used to perform the general functions discussed above.

As used herein, the term "affordance" refers to a user-interactive graphical user interface object (e.g., a graphical user interface object that is configured to respond to inputs directed toward the graphical user interface object) that may be displayed on the display screen of device 100, 300, 500, and/or 550 (FIGS. 1, 3, 5A and 5C). Examples of user-interactive graphical user interface objects include, without limitation, a button, slider, icon, selectable menu item, switch, hyperlink, or other user interface control.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
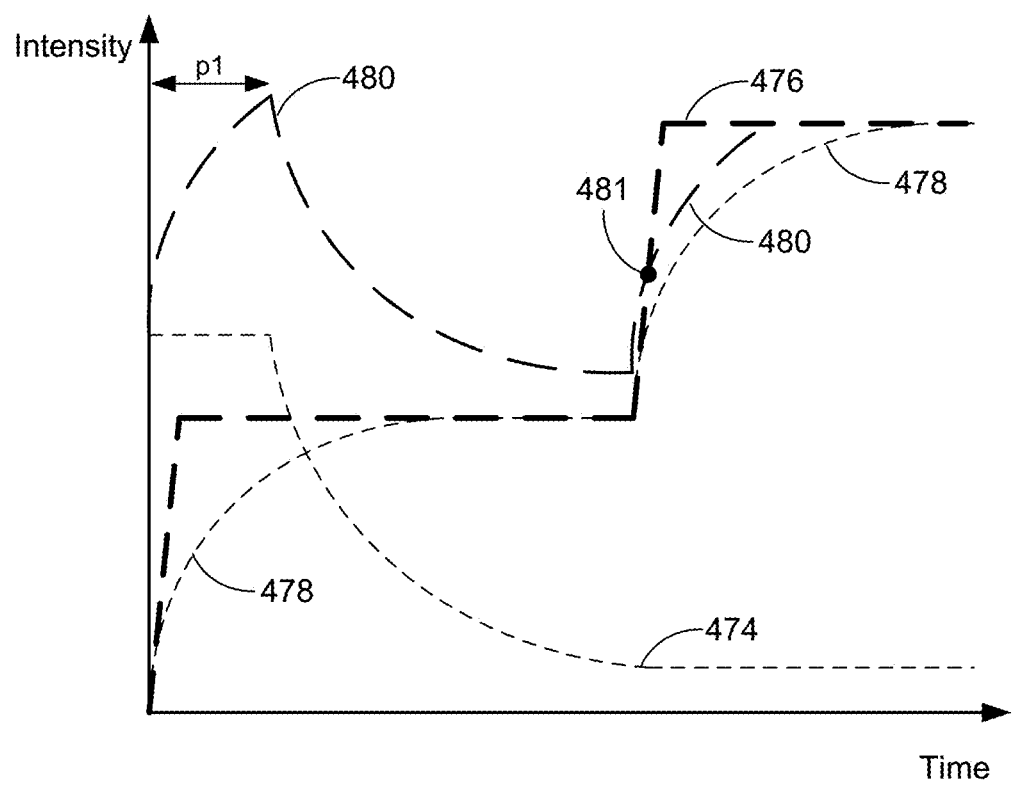
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
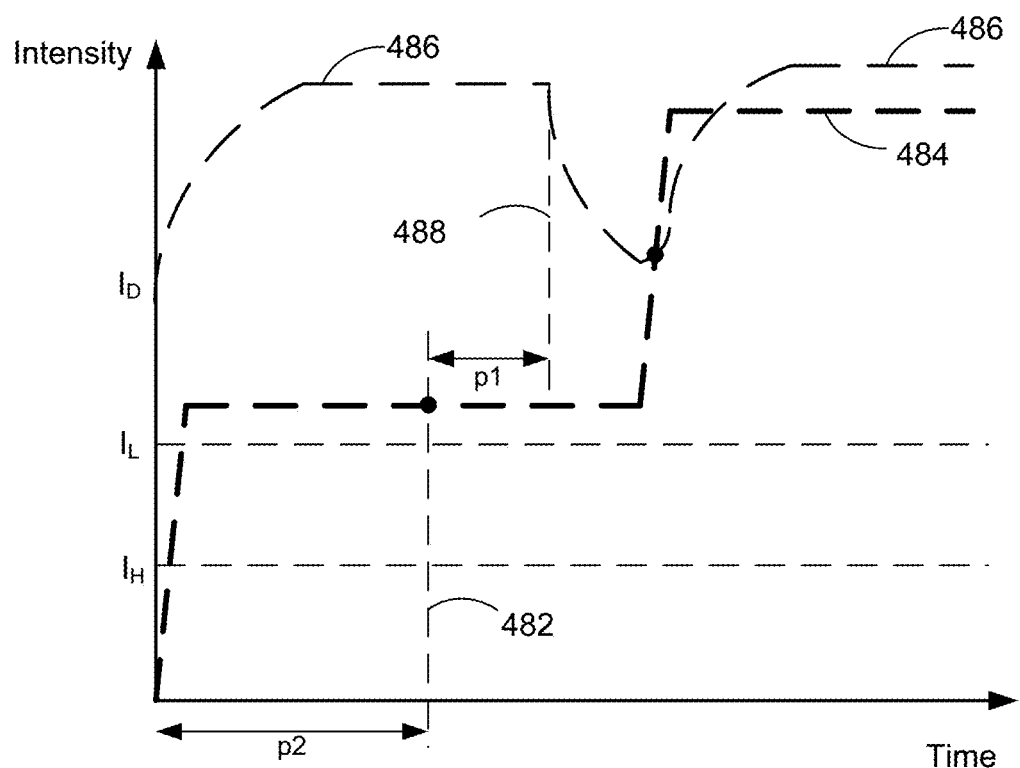

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
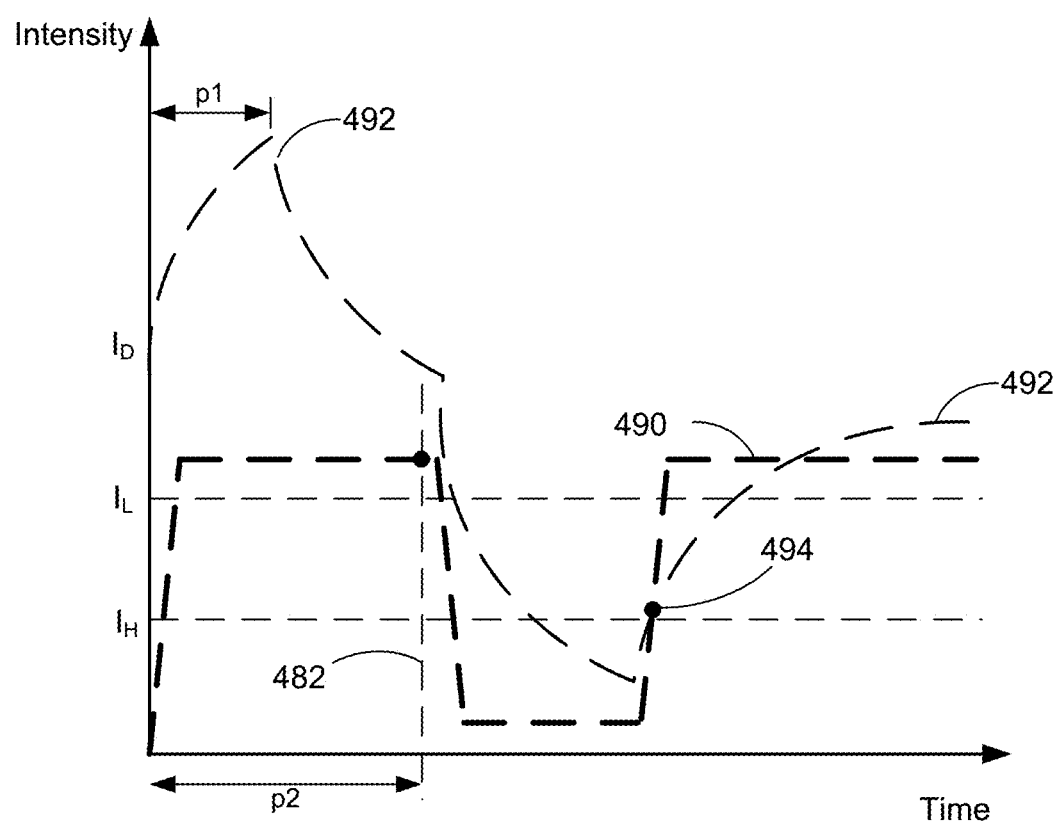

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100, device 300, device 500, or device 550, with a display, optionally a touch-sensitive surface, and optionally one or more sensors to detect intensities of contacts with the touch-sensitive surface and/or to detect signals from a stylus associated with the device.

FIGS. 6A-6N illustrate exemplary user interfaces for displaying content in a note-taking application in accordance with some embodiments. The user interfaces in these figures are used to illustrate the processes described below, including the processes in FIGS. 7A-7C. For convenience of explanation, some of the embodiments will be discussed with reference to operations performed on a device with a touch-sensitive display (where the touch-sensitive surface and the display are combined, for example on touch screen 112 or touch screen 556). In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). In some embodiments, the device is personal electronic device 550 and the display is touch screen 556. For convenience of explanation, the embodiments described with reference to FIGS. 6A-6N and 7A-7C will be discussed with reference to operations performed on a device with a touch-sensitive display system 112 and/or touch screen 556. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112 and/or touch screen 556. However, analogous operations are, optionally, performed on a device with a display 450 and a separate touch-sensitive surface 451 in response to detecting the contacts described in FIGS. 6A-6N on (or near) the touch-sensitive surface 451 while displaying the user interfaces shown in FIGS. 6A-6N on the display 450.

FIGS. 6A-6N illustrate exemplary user interfaces for displaying content in a note-taking application in accordance with some embodiments. While FIG. 4A shows touch screen 112 with additional details of device 100 (e.g., speaker 111, optical sensor 164, proximity sensor 166, etc.), for sake of clarity, FIGS. 6A, 6B, and 6D simply show touch screen 112 of device 100, without showing other details of device 100.

FIG. 6A illustrates displaying a note entry user interface 610 of a note-taking application (e.g., a personal note-taking application, such as the Notes application by Apple Inc. of Cupertino, Calif.) on a display (e.g., touch screen 112) of a device (e.g., device 100). Note entry user interface 610 includes text entry area 618 and keyboard 614. A user may enter electronic text using keyboard 614, and the entered text (e.g., electronic text content 616) is displayed in text entry area 618. Note entry user interface 610 also includes navigation icon 612, content icon 620, camera icon 622, and "done" icon 624. In some embodiments, when a gesture (e.g., a tap gesture) is detected on "done" icon 624, keyboard 614 is dismissed so that the user can view more of the note. In some embodiments, when a gesture (e.g., a tap gesture) is detected on navigation icon 612, notes list interface 630 (FIG. 6B) of the note-taking application is displayed. In some embodiments, when a gesture (e.g., a tap gesture) is detected on camera icon 622, the user is provided options for adding photos to the note (e.g., by taking a new photo or selecting from existing photos). In some embodiments, when a gesture (e.g., a tap gesture) is detected on content icon 620, categorized-content view interface 650 (FIG. 6D) of the note-taking application is displayed.

Figure 6B:

FIG. 6B illustrates displaying a notes list interface 630 of a note-taking application on a display (e.g., touch screen 112) of a device (e.g., device 100). Notes list interface 630 includes a listing of notes 634 that are generated by the note-taking application (e.g., created or saved by the note-taking application). In response to selection of a respective note 634 (e.g., by performing a gesture, such as a tap gesture, on the respective note 634 in notes list interface 630), an interface similar to note entry user interface 610 (FIG. 6A) is displayed, where the contents of the respective note 634 are displayed in text entry area 618. For example, in response to selection of note 634-1 (e.g., when a gesture, such as a tap gesture, is detected on note 634-1), note entry user interface 610 (FIG. 6A) is displayed. Notes list interface 630 also includes content icon 620 and new note icon 632. In some embodiments, in response to detection of a gesture (e.g., a tap gesture) on new note icon 632, a new note entry user interface (e.g., similar to note entry user interface 610, FIG. 6A) is displayed and a new note may be created. In some embodiments, in response to detection of a gesture (e.g., a tap gesture) on content icon 620, categorized-content view interface 650 (FIG. 6D) of the note-taking application is displayed.

Figure 6C:
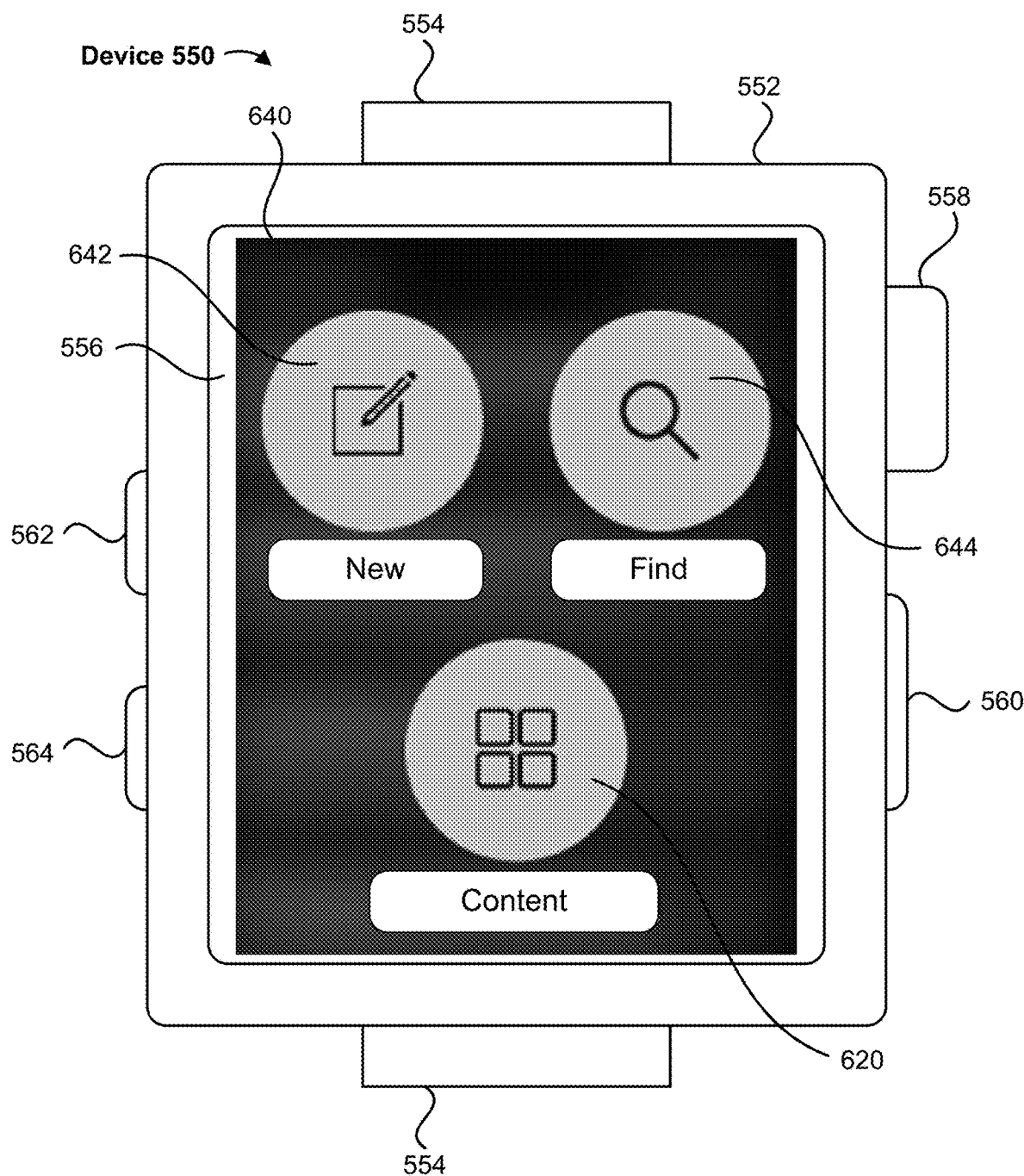

FIG. 6C illustrates displaying a menu interface 640 of a note-taking application on a display (e.g., touch screen 556) of a device (e.g., device 550). Menu interface 640 includes new note icon 642, find icon 644, and content icon 620. In some embodiments, in response to detection of a gesture (e.g., a tap gesture) on new note icon 642, a new note entry user interface of the note-taking application is displayed and a new note may be created. In some embodiments, in response to detection of a gesture (e.g., a tap gesture) on find icon 644, a search interface of the note-taking application (e.g., allowing the user to enter search terms and perform a search of content in the note-taking application) is displayed. In some embodiments, in response to detection of a gesture (e.g., a tap gesture) on content icon 620, categorized-content view interface 660 (FIGS. 6E-6G) of the note-taking application is displayed.

Figure 6D:
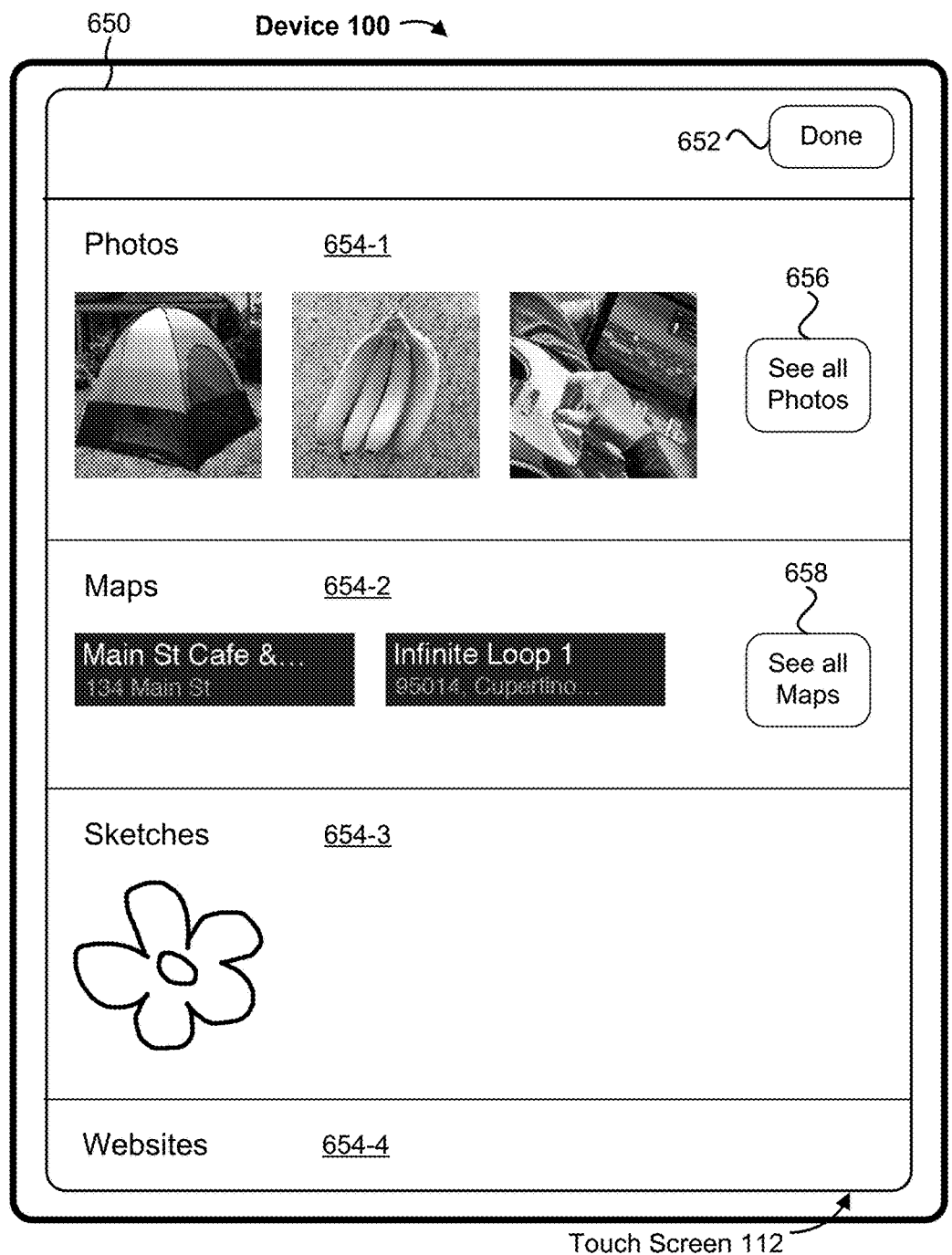

FIG. 6D illustrates displaying, in a categorized-content view interface 650, on touch screen 112 of device 100, a scrollable list of content created and/or selected by a user for notes of a note-taking application (e.g., notes 634, FIG. 6B). In some embodiments, a gesture (e.g., a swipe gesture upward and/or downward) on the display (e.g., touch screen 112) of the device (e.g., device 100) scrolls through categorized-content view interface 650. In some embodiments, categorized-content view interface 650 includes at least some of the content created and/or selected by the user that is distinct from the electronic text content input by the user (e.g., distinct from electronic text content 616, FIG. 6A). In some embodiments, the content displayed in categorized-content view interface 650 is organized and displayed by category (e.g., photos 654-1, maps 654-2, user sketches 654-3, and websites 654-4). Categorized-content view interface 650 also includes "done" icon 652 and affordances for respective content categories (e.g., "see all photos" icon 656 and "see all maps" icon 658). In some embodiments, in response to detection of a gesture (e.g., a tap gesture) on "done" icon 652, the previous user interface is displayed (e.g., note entry user interface 610, FIG. 6A, notes list interface 630, FIG. 6B, or another user interface from which content icon 620 was activated). In some embodiments, in response to detection of a gesture (e.g., a tap gesture) on a respective affordance for a respective content category, all of the content from the respective content category is displayed in a scrollable list. For example, in response to detection of a tap gesture on "see all photos" icon 656, thumbnails of all of the photos in the note-taking application (e.g., in the photos 654-1 content category) are displayed in a scrollable list. In some embodiments, if all of the content for a respective content category is already displayed in categorized-content view interface 650, then an affordance for that respective content category is not displayed. For example, as shown in FIG. 6D, if there is only one user sketch for the user sketches 654-3 content category, an affordance for the user sketches 654-3 content category is not displayed.

Note that in the categorized-content view interface 650, a respective content item created and/or selected by the user that is distinct from the electronic text content input by the user is not displayed as part of (e.g., contained within) a corresponding note. Rather, the respective content item is displayed separately from the corresponding note.

Figure 6E:
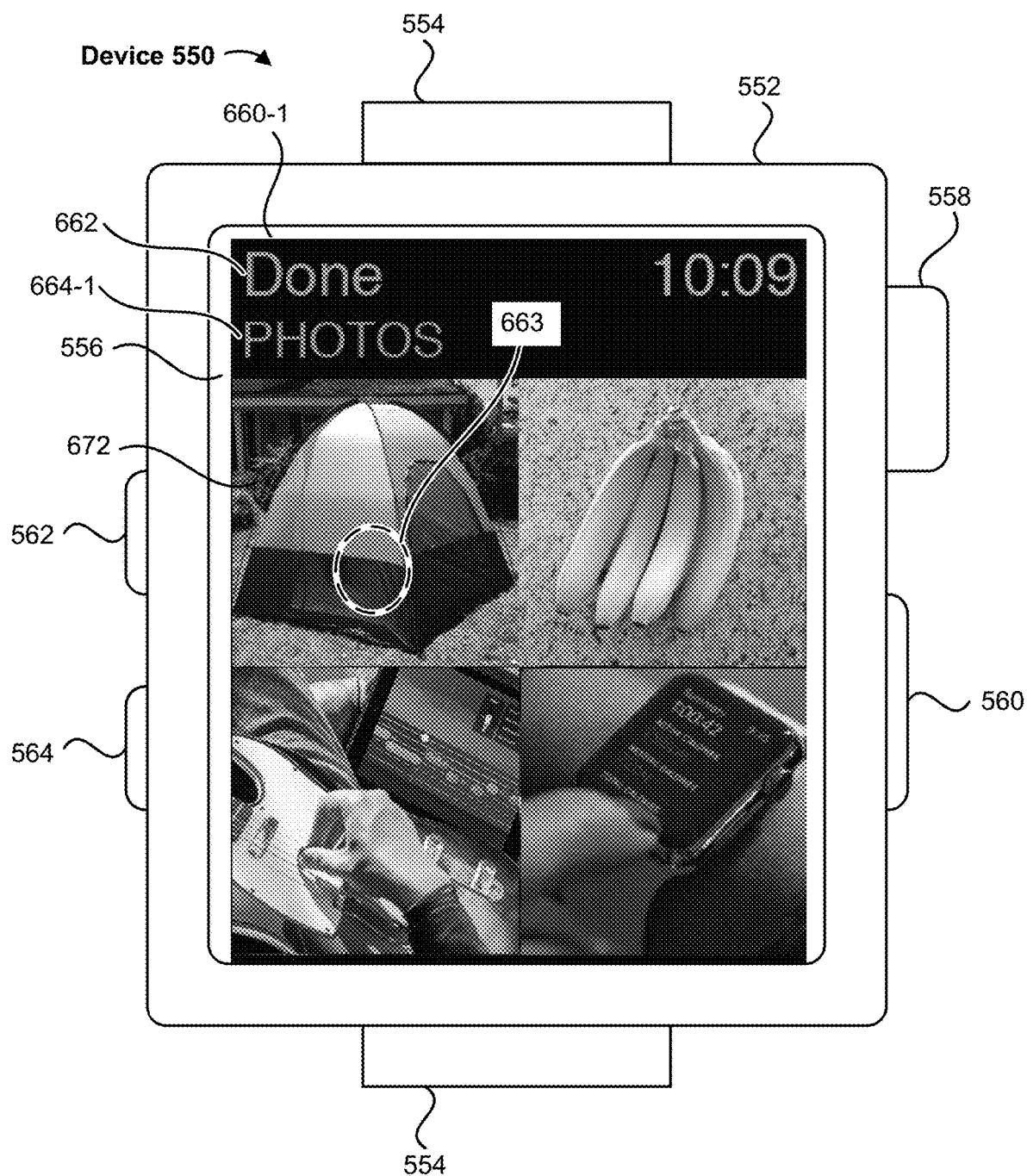
Figure 6F:
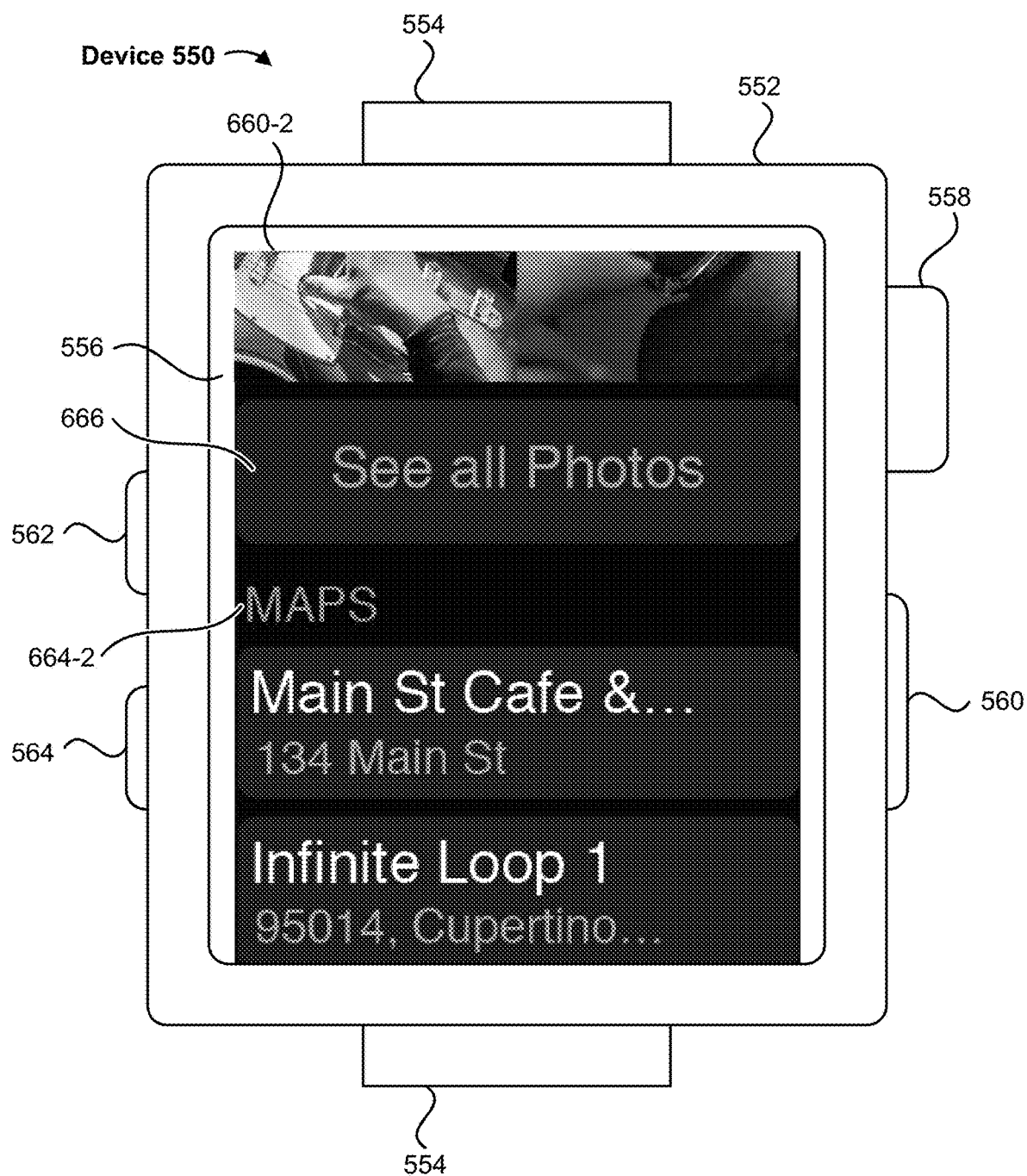
Figure 6G:
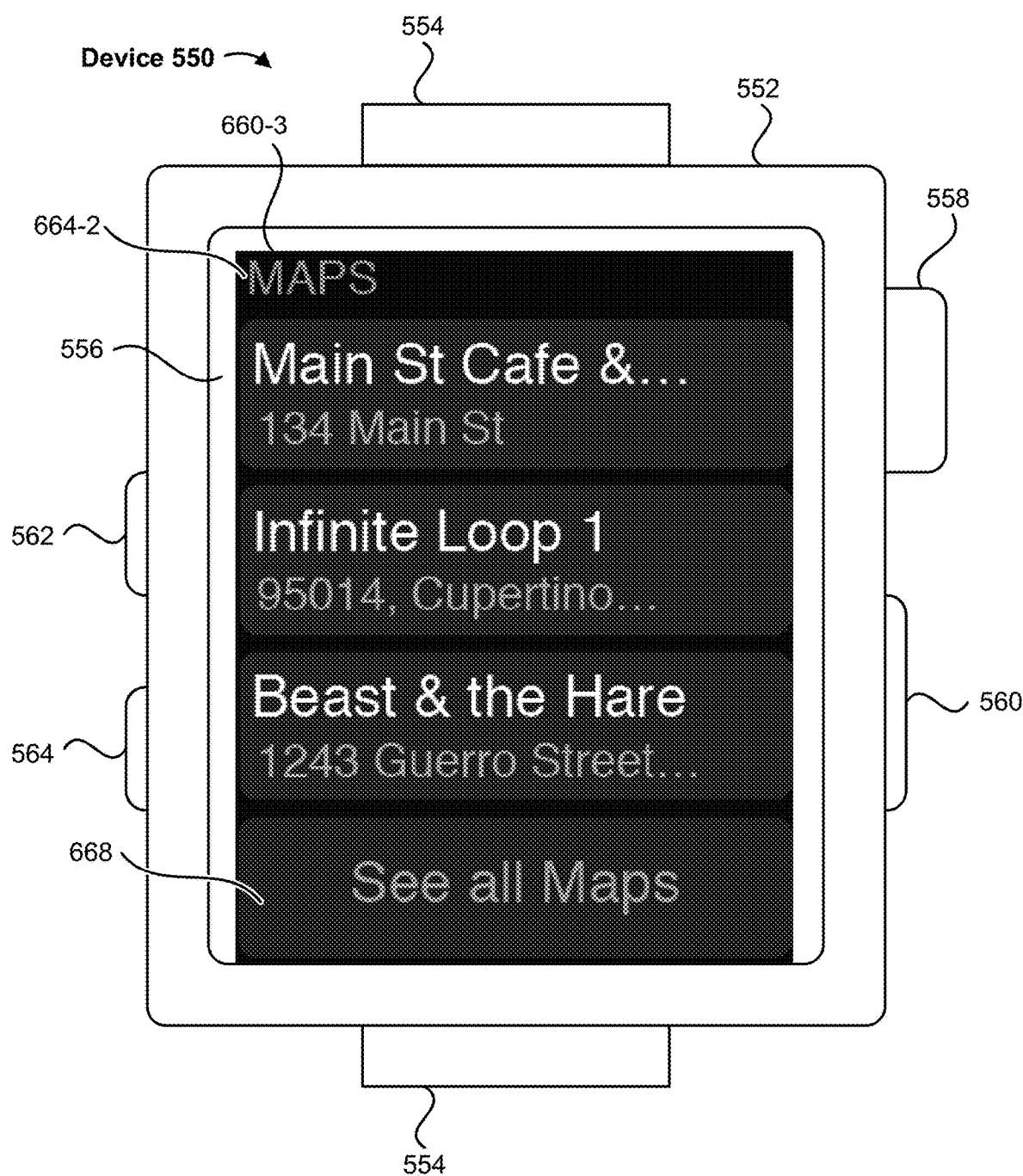
Figure 6H:
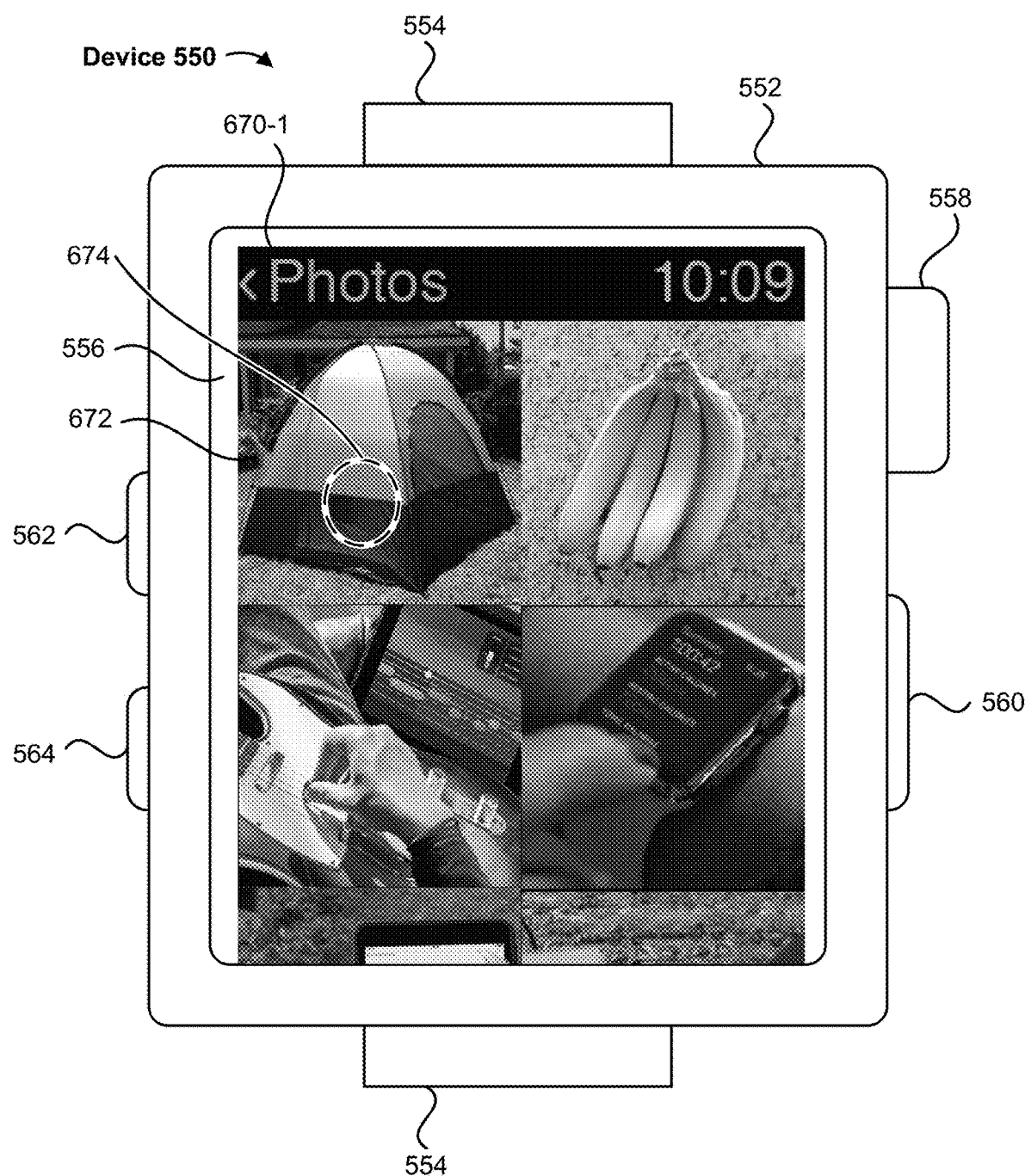
Figure 6I:
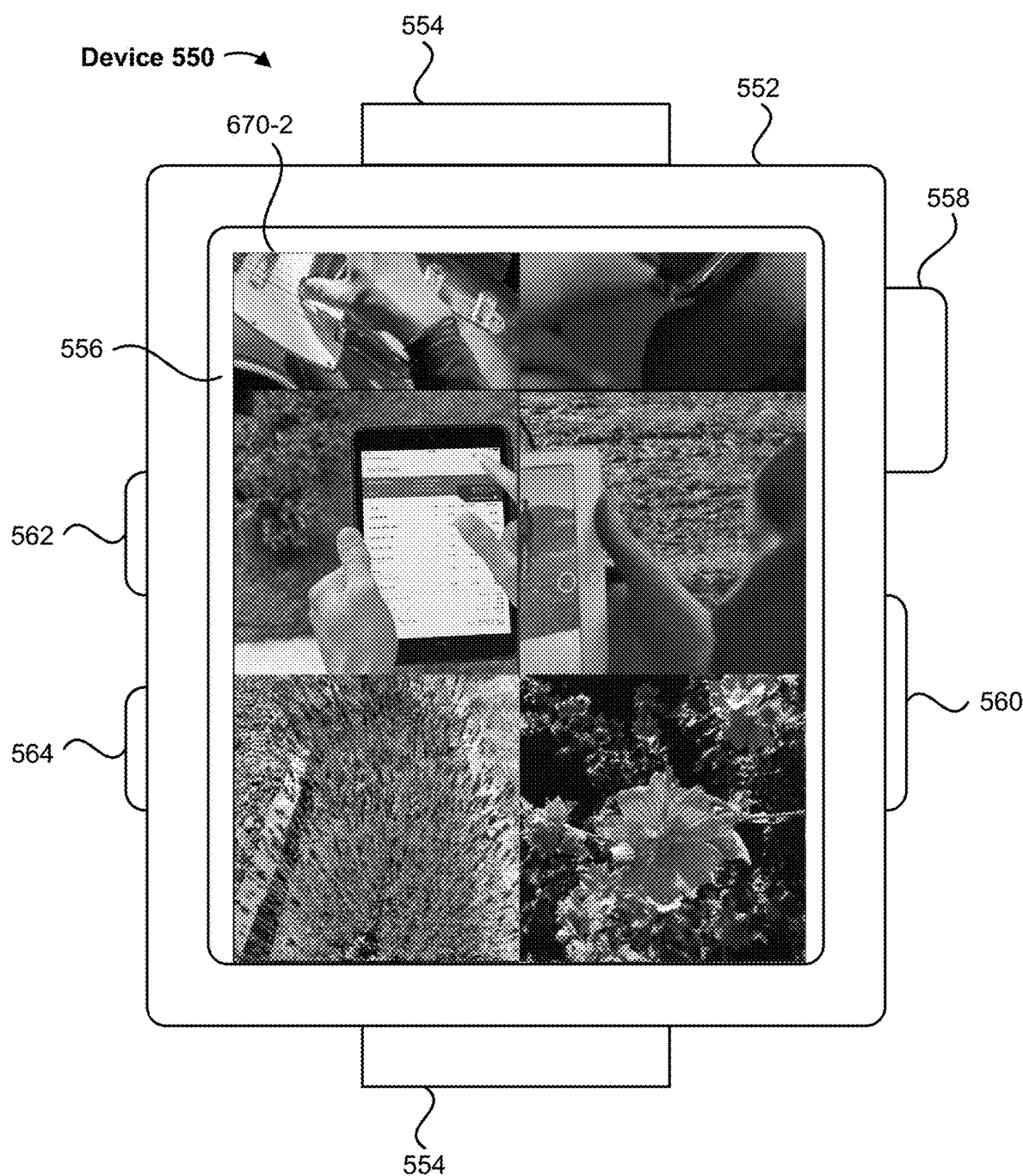

FIGS. 6E-6G illustrate displaying, in a categorized-content view interface 660, on touch screen 556 of device 550, a scrollable list of content created and/or selected by a user for one or more notes of a note-taking application. In some embodiments, a gesture (e.g., a swipe gesture upward and/or downward) on the display (e.g., touch screen 556) of the device (e.g., device 550) scrolls through categorized-content view interface 660 (e.g., from categorized-content view interface 660-1 in FIG. 6E to categorized-content view interface 660-2 in FIG. 6F to categorized-content view interface 660-3 in FIG. 6G). In some embodiments, categorized-content view interface 660 includes at least some of the content created and/or selected by the user that is distinct from the electronic text content input by the user. In some embodiments, the content displayed in categorized-content view interface 660 is organized and displayed by category (e.g., photos 664-1 and maps 664-2). Categorized-content view interface 660 also includes "done" icon 662 and zero or more affordances for respective content categories (e.g., "see all photos" icon 666 and "see all maps" icon 668). In some embodiments, in response to detection of a gesture (e.g., a tap gesture) on "done" icon 662, the previous user interface is displayed (e.g., menu interface 640, FIG. 6C, or another user interface from which content icon 620 was activated). In some embodiments, in response to detection of a gesture (e.g., a tap gesture) on a respective affordance for a respective content category, all of the content from the respective content category is displayed in a scrollable list. For example, in response to detection of a tap gesture on "see all photos" icon 666, thumbnails of all of the photos in the note-taking application (e.g., in the photos 664-1 content category) are displayed in a scrollable list (as shown in FIGS. 6H-6I). In some embodiments, if all of the content for a respective content category is already displayed in categorized-content view interface 660, then an affordance for that respective content category is not displayed.

Figure 6J:
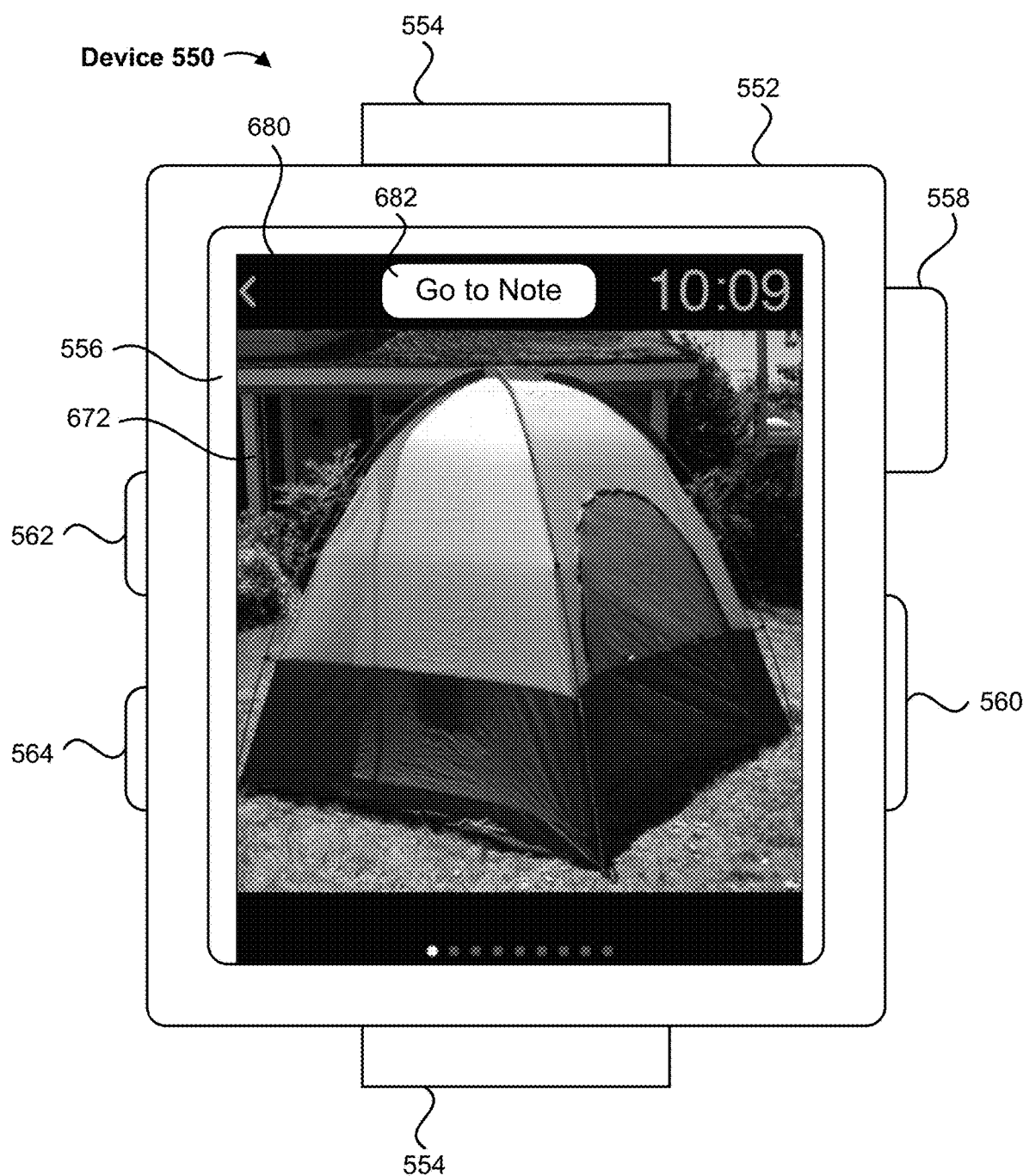
Figure 6K:
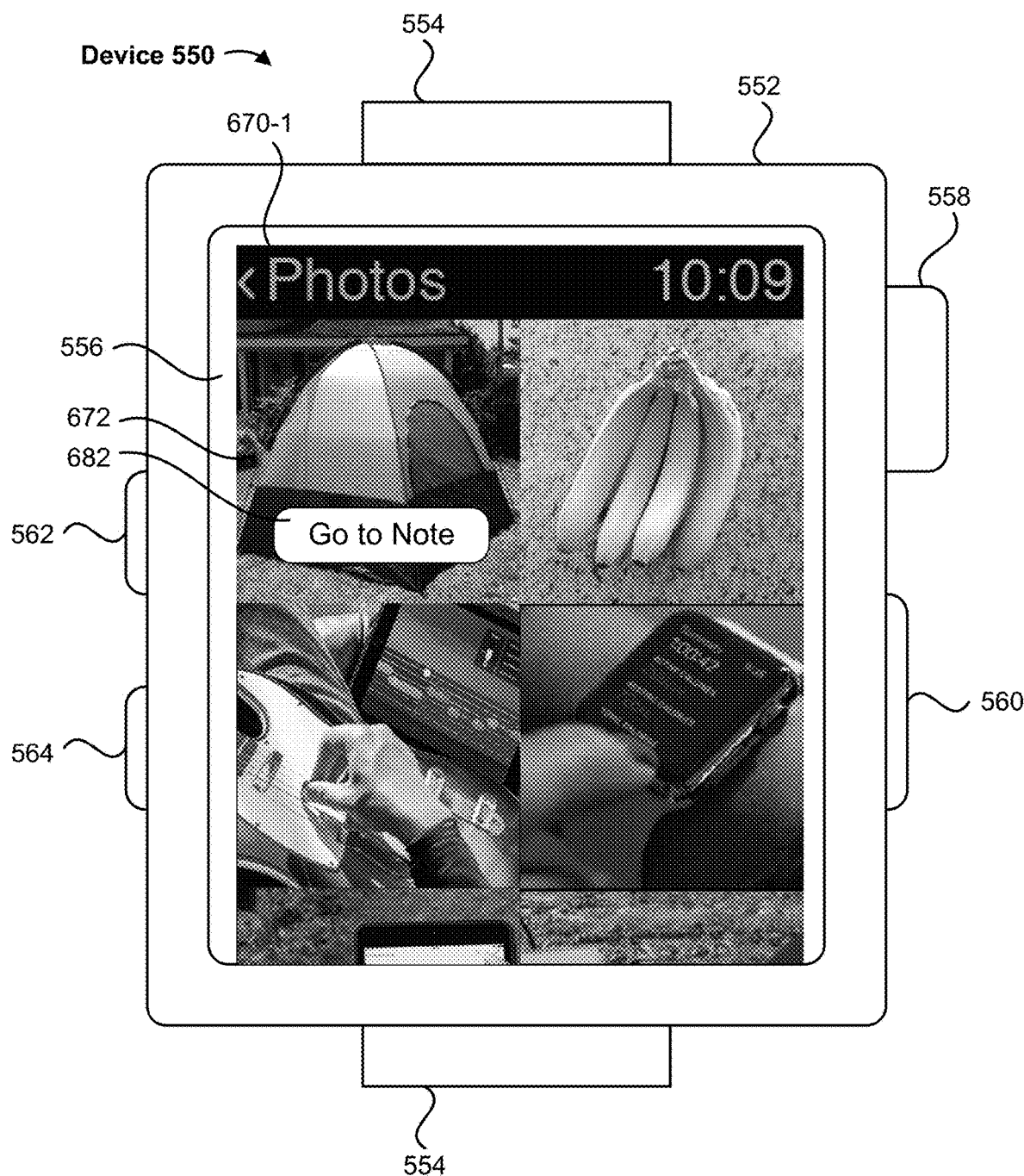
Figure 6L:
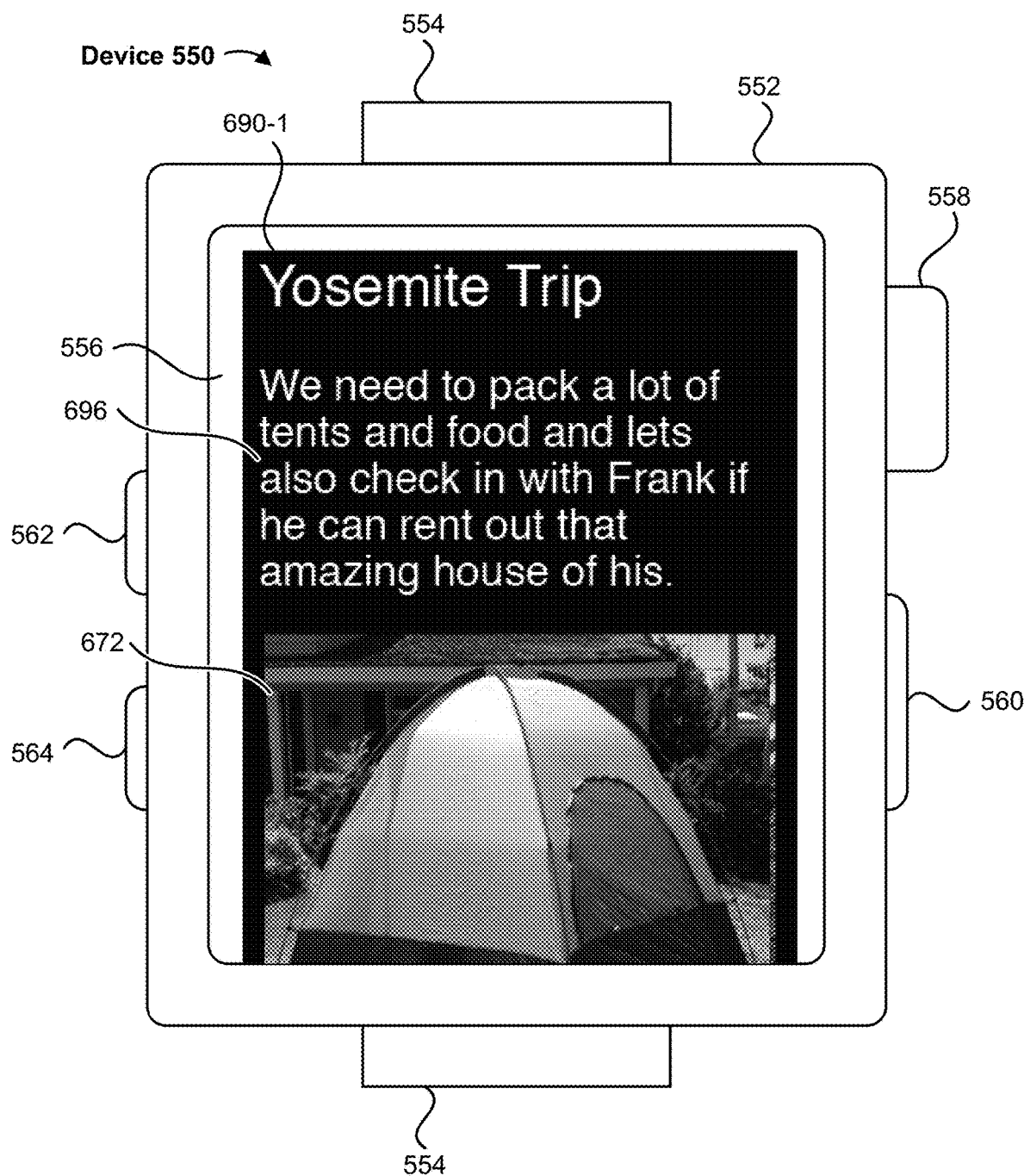
Figure 6M:
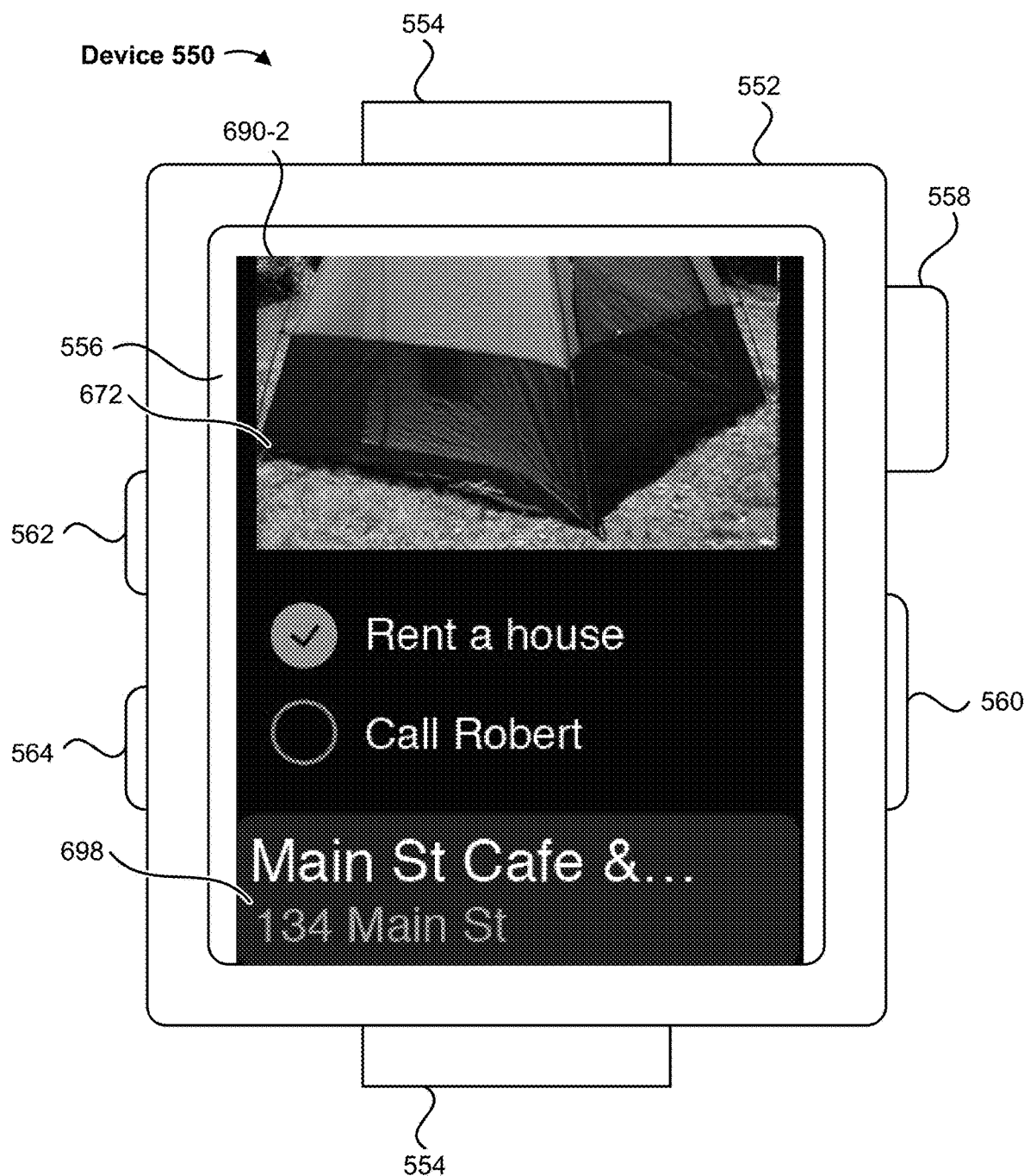
Figure 6N:
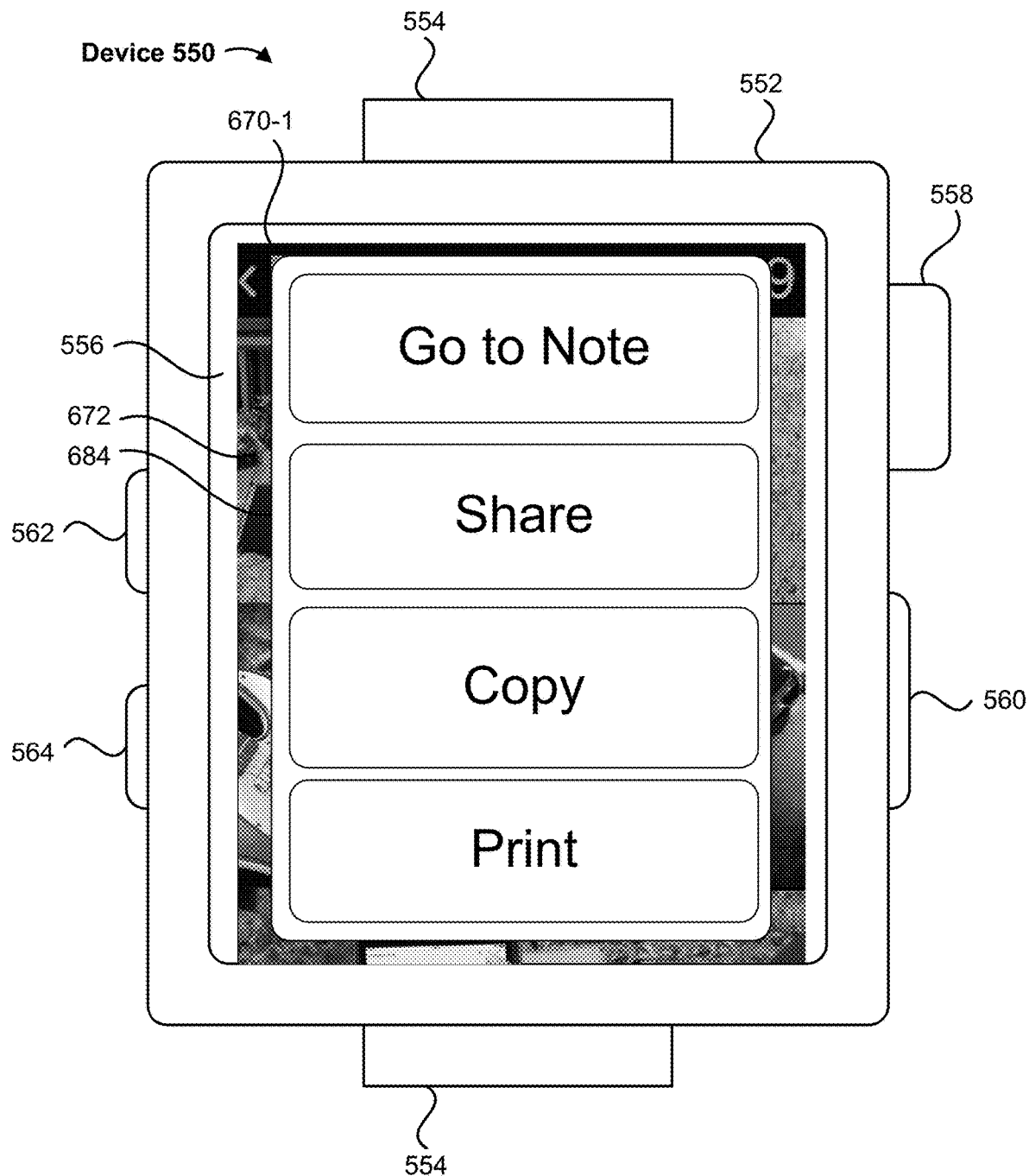

Note that in the categorized-content view interface 660, a respective content item created and/or selected by the user that is distinct from the electronic text content input by the user is not displayed as part of (e.g., contained within) a corresponding note (e.g., as shown in FIGS. 6L-6M). Rather, the respective content item is displayed separately from the corresponding note. In some embodiments, in response to detection of a tap gesture (e.g., gesture 663, FIG. 6E) on a content item (e.g., photo 672 in categorized-content view interface 660-1), an enlarged version of the content item is displayed, as shown in FIG. 6J.

FIGS. 6H-6I illustrate displaying additional (or all) content items in a respective content category in a content category user interface 670 on touch screen 556 of device 550. In some embodiments, the content category user interface 670 includes a scrollable list of all the content items in the respective content category. For example, content category user interface 670 includes all of the photos in the photos 664-1 content category (FIG. 6E). In some embodiments, a gesture (e.g., a swipe gesture upward and/or downward) on the display (e.g., touch screen 556) of the device (e.g., device 550) scrolls through content category user interface 670 (e.g., from content category user interface 670-1 in FIG. 6H to content category user interface 670-2 in FIG. 6I).

FIG. 6J illustrates displaying an enlarged content item (e.g., photo 672) in an item interface 680, without displaying the corresponding note. In some embodiments, in response to detection of a tap gesture (e.g., gesture 663, FIG. 6E, or gesture 674, FIG. 6H) on a content item (e.g., photo 672 in categorized-content view interface 660, FIG. 6E, or photo 672 in content category user interface 670, FIG. 6H), an enlarged version of the content item is displayed, as shown in FIG. 6J. In some embodiments, item interface 680 includes "go to note" icon 682. In some embodiments, in response to selection of the "go to note" icon 682 (e.g., with a tap gesture), the corresponding note that includes the content item (e.g., photo 672) is displayed (as shown in FIGS. 6L-6M). In some embodiments, item interface 680 includes an affordance (e.g., a back arrow icon) for returning to content category user interface 670 (FIG. 6H). In some embodiments, when an enlarged content item is displayed, a gesture (e.g., a swipe gesture left and/or right) on the display (e.g., touch screen 556) scrolls through enlarged versions of additional content items in the content category.

FIG. 6K illustrates displaying "go to note" icon 682 in response to an input in content category user interface 670. In some embodiments, "go to note" icon 682 is displayed in response to a tap-and-hold gesture on photo 672 (e.g., gesture 674, FIG. 6H). In some embodiments, "go to note" icon 682 is displayed in response to a deep press gesture on photo 672 (e.g., gesture 674, FIG. 6H). In some embodiments, in response to selection of the "go to note" icon 682 (e.g., with a tap gesture), the corresponding note that includes the content item (e.g., photo 672) is displayed (as shown in FIGS. 6L-6M).

FIGS. 6L-6M illustrate displaying a note and associated content item(s). As shown here, note view interface 690 includes electronic text content input by the user (e.g., electronic text content 696) and content items associated with the note (e.g., photo 672 and map 698). In some embodiments, the note is displayed in note view (e.g., in note view interface 690), but the note is not displayed in the categorized-content view (e.g., in categorized-content view interface 660, FIG. 6E). In some embodiments, a gesture (e.g., a swipe gesture upward and/or downward) on the display (e.g., touch screen 556) of the device (e.g., device 550) scrolls through note view interface 690 (e.g., from note view interface 690-1 in FIG. 6L to note view interface 690-2 in FIG. 6M).

FIG. 6N illustrates displaying menu 684 in response to an input in content category user interface 670. In some embodiments, menu 684 is displayed in response to a tap-and-hold gesture on photo 672 (e.g., gesture 674, FIG. 6H). In some embodiments, menu 684 is displayed in response to a deep press gesture on photo 672 (e.g., gesture 674, FIG. 6H). In some embodiments, in response to selection of the "Go to Note" icon in menu 684 (e.g., with a tap gesture), the corresponding note that includes the content item (e.g., photo 672) is displayed (as shown in FIGS. 6L-6M). In some embodiments, in response to selection of the "Share" icon in menu 684 (e.g., with a tap gesture), a user interface for sharing (e.g., via email, social media, mobile ad-hoc network (e.g., AirDrop by Apple, Inc. of Cupertino, Calif.), and/or a messaging application) the content item (e.g., photo 672) is displayed. In some embodiments, in response to selection of the "Copy" icon in menu 684 (e.g., with a tap gesture), the content item (e.g., photo 672) is copied. In some embodiments, in response to selection of the "Print" icon in menu 684 (e.g., with a tap gesture), an interface for printing the content item (e.g., photo 672) is displayed and/or the content item (e.g., photo 672) is printed.

In some embodiments, the notes in the note-taking application include imported notes (e.g., notes created by other users), which may include electronic text content input by the other users and content created and/or selected by the other users that is distinct from the electronic text content input by the other users. As used herein, electronic text content input by the user includes electronic text content input by the other users in the imported notes because both are handled in the same manner by the note-taking application. Similarly, as used herein, content created and/or selected by the user that is distinct from the electronic text content input by the user includes content created and/or selected by the other users that is distinct from the electronic text content input by the other users in the imported notes because both are handled in the same manner by the note-taking application.

FIGS. 7A-7C are flow diagrams illustrating a method 700 of displaying content in a note-taking application in accordance with some embodiments. The method 700 is performed at an electronic device (e.g., device 300, FIG. 3, or portable multifunction device 100, FIG. 1A, or device 500, FIG. 5A, or device 550, FIG. 5C) with a display and a note-taking application. In some embodiments, the electronic device optionally includes a touch-sensitive surface, one or more sensors to detect intensity of contacts with the touch-sensitive surface, and/or one or more sensors to detect signals from a stylus associated with the device. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an efficient way to display content in a note-taking application. The method provides a fast way to find content and/or find corresponding notes in a note-taking application without having to enter search terms and perform a search. The method reduces the number, extent, and/or nature of the inputs from a user when displaying content in a note-taking application, thereby creating a more efficient human-machine interface. For battery-operated electronic devices, enabling a user to find and display content in a note-taking application faster and more efficiently conserves power and increases the time between battery charges.

The device displays (702) on the display (e.g., touch screen 112 or touch screen 556), a first user interface of the note-taking application (e.g., a list of note titles, an individual note, or a menu in a personal note-taking application, such as the Notes application by Apple Inc. of Cupertino, Calif.). In some embodiments, the first user interface is a list of note titles (e.g., notes list interface 630, FIG. 6B). In some embodiments, the first user interface is an individual note (e.g., note entry user interface 610, FIG. 6A). In some embodiments, the first user interface is a menu in a personal note-taking application, such as the Notes application by Apple Inc. of Cupertino, Calif. (e.g., menu interface 640, FIG. 6C).

The note-taking application includes a plurality of notes prepared by a user (e.g., notes 634, FIG. 6B). The plurality of notes prepared by the user includes electronic text content input by the user, and content created and/or selected by the user that is distinct from the electronic text content input by the user. In some embodiments, at least some of the notes (of the plurality of notes) include electronic text (also called machine-readable text) (e.g., electronic text 616, FIG. 6A) that is input via a virtual keyboard (e.g., keyboard 614, FIG. 6A) that is displayed while the user types text in a respective note and/or electronic text that is input to a respective note via voice recognition of audio input by the user. The content created and/or selected by the user includes content from a plurality of distinct content categories (e.g., photos 654-1, maps 654-2, user sketches 654-3, and/or websites 654-4, as shown in FIG. 6D). For example, at least some of the notes include hand-drawn sketches and/or text created by the user in a respective note (e.g., drawn with a finger or stylus), digital images (e.g., photos and/or videos) selected by the user for display in a respective note, mapping content (e.g., geolocation data, addresses, directions, maps, and/or links thereto) selected by the user for display in a respective note, and/or website content (e.g., web pages, portions of web pages, and/or links thereto) selected by the user for display in a respective note. The first user interface displays a categorized-content-view affordance (e.g., a virtual button or other icon for activating a categorized-content view in the note-taking application, such as content icon 620 in FIGS. 6A-6C).

In some embodiments, the first user interface concurrently displays (704), with the categorized-content-view affordance, a first note prepared by the user of the electronic device. FIG. 6A, for example, shows a first user interface (e.g., note entry user interface 610) concurrently displaying, with the categorized-content-view affordance (e.g., content icon 620), a first note prepared by the user of the electronic device (e.g., device 100).

In some embodiments, the first user interface concurrently displays (706) the categorized-content-view affordance and the first note without displaying other notes prepared by the user in the note-taking application. For example, in FIG. 6A, note entry user interface 610 concurrently displays content icon 620 and the first note (e.g., labeled "Yosemite Trip") without displaying other notes prepared by the user in the note-taking application (e.g., the "Shopping list" note 634-2, FIG. 6B).

The device detects (708) activation of the categorized-content-view affordance. For example, for an electronic device with a touch-sensitive display (e.g., touch screen 112 or touch screen 556), detecting activation of the categorized-content-view affordance includes detecting a gesture, such as a finger tap gesture, on the categorized-content-view affordance (e.g., content icon 620 in FIG. 6A, content icon 620 in FIG. 6B, or content icon 620 in FIG. 6C).

The device, in response to detecting activation of the categorized-content-view affordance, displays (710), in a categorized-content view, a scrollable list of at least some of the content created and/or selected by the user that is distinct from the electronic text content input by the user, wherein the content in the scrollable list is organized and displayed by the content categories. For example, in response to detecting activation of content icon 620 in FIG. 6A or icon 620 in FIG. 6B, the device (e.g., device 100) displays a scrollable list of content in the note-taking application, with the content in the list organized and displayed by category (e.g., photos 654-1, maps 654-2, user sketches 654-3, and websites 654-4), as shown in FIG. 6D. As another example, in response to detecting activation of content icon 620 in FIG. 6C, the device (e.g., device 550) displays a scrollable list of content in the note-taking application, with the content in the list organized and displayed by category (e.g., photos 664-1, maps 664-2, etc.), as shown in FIGS. 6E-6G.

Note that in the categorized-content view (e.g., categorized-content view interface 650, FIG. 6D, or categorized-content view interface 660, FIGS. 6E-6G), a respective content item created and/or selected by the user that is distinct from the electronic text content input by the user is not displayed as part of (e.g., contained within) a corresponding note. Rather, the respective content item is displayed separately from the corresponding note.

Although a categorized-content-view affordance (e.g., content icon 620 in FIGS. 6A-6C) is used to access the categorized-content view in some embodiments, other ways to access the categorized-content view do not use or require a categorized-content-view affordance. In some embodiments, for an electronic device with a touch-sensitive surface, the categorized-content view is displayed in response to detecting a predefined gesture while the note-taking application is displayed, such as a swipe gesture (e.g., a swipe up gesture). In some embodiments, for an electronic device with a touch-sensitive display and one or more sensors to detect intensity of contacts with the touch-sensitive display, the categorized-content view is displayed in response to detecting a press gesture while the note-taking application is displayed, such as a deep press gesture (e.g., a deep press gesture at or near a predefined edge of the display, or anywhere on the display). In some embodiments, for an electronic device with a physical button (e.g., a crown or other physical button on a smart watch such as device 550), the categorized-content view is displayed in response to detecting activation of the button in a predefined manner while the note-taking application is displayed. Because there are ways to access the categorized-content view that do not use or require a categorized-content-view affordance, in some embodiments, the first user interface in the note-taking application (and optionally other user interfaces in the note-taking application) does not include the categorized-content-view affordance. In such embodiments, in response to detecting one of these other inputs, the categorized-content view is displayed.

In some embodiments, the content categories in the scrollable list include (712) hand-drawn sketches created by the user. For example, for a device with a touch-sensitive surface, hand-drawn sketches created by the user include drawings and/or hand-written notes input on the touch-sensitive surface with a finger or a stylus. FIG. 6D, for example, shows a hand-drawn sketch in sketches 654-3 content category.

In some embodiments, the categorized-content view displays (714), for a respective content category, a predefined number of content items in the respective content category, and an affordance for the respective content category that when activated results in the display of additional content items in the respective content category. For example, FIGS. 6E-6G show categorized-content view interface 660 displaying, for the photos content category 664-1, four photos and an affordance for the photos content category 664-1 (e.g., "see all photos" icon 666), and for the maps content category 664-2, three map content items and an affordance for the maps content category 664-2 (e.g., "see all maps" icon 668).

In some embodiments, the predefined number of content items in the respective content category are (716) configured to be concurrently displayed on the display at a same time. In some embodiments, the predefined number is chosen so that the predefined number of content items fit on a single screen of the display, without needing to scroll the list. FIG. 6E, for example, shows four photos in the photos content category 664-1 concurrently displayed on touch screen 556 at the same time, without needing to scroll the list.

In some embodiments, the predefined number of content items in the respective content category and the affordance for the respective content category are (718) configured to be concurrently displayed on the display at a same time. In some embodiments, the predefined number is chosen so that the predefined number of content items and the affordance for the respective content category fit on a single screen of the display, without needing to scroll the list, as shown in FIG. 6G.

In some embodiments, the content items displayed as part of the predefined number of content items in the respective content category correspond (720) to the most recent content items created and/or selected by the user in the respective content category. For example, the four photos in FIG. 6E correspond to the four most recent photos created and/or selected by the user for use in one or more notes. For example, the three locations in FIG. 6G correspond to the three most recent maps created and/or selected by the user for use in one or more notes. For example, the one sketch in FIG. 6D corresponds to the most recent (and only) sketch created and/or selected by the user for use in one or more notes. In some embodiments, if the total number of content items in a respective content category is less than the predefined number of content items in the respective content category, all of the content items are displayed.

In some embodiments, the content items displayed as part of the predefined number of content items in the respective content category correspond (722) to the most recently displayed content items in the respective content category. For example, the four photos in FIG. 6E correspond to the four photos most recently displayed in the note-taking application. For example, the three locations in FIG. 6G correspond to the three maps most recently displayed in the note-taking application. For example, the one sketch in FIG. 6D corresponds to the sketch most recently displayed in the note-taking application. In some embodiments, if the total number of content items in a respective content category is less than the predefined number of content items in the respective content category, all of the content items are displayed.

In some embodiments, the device detects (724) an input on a first content item (e.g., a digital image) in the scrollable list of content, wherein the first content item is associated with a first note that also contains first electronic text content input by the user. For example, the first note includes the first electronic text content input by the user and the first content item. In some embodiments, the first note is displayed in a note view (e.g., FIG. 6A or FIGS. 6L-6M), but the first note is not displayed in the categorized-content view (e.g., FIG. 6D or FIGS. 6E-6G). In the note view, the first note is displayed with both the first electronic text content input by the user and the first content item. FIG. 6L, for example, shows the first note displayed with both electronic text content 696 input by the user and photo 672.

In accordance with a determination that the input is a first type of input, the device enlarges the first content item without displaying the first note (and, in some embodiments, ceases to display the scrollable list of content). For example, for an electronic device with a touch-sensitive display (e.g., touch screen 556), the device determines that the input is a tap gesture on the first content item in the scrollable list of content (e.g., tap gesture 663 in FIG. 6E), and, in response, enlarges the first content item without displaying the first note, as shown in FIG. 6J.

In accordance with a determination that the input is a second type of input, distinct from the first type of input, the device displays the first note (and, in some embodiments, ceases to display the scrollable list of content). For example, for an electronic device with a touch-sensitive display (e.g., touch screen 556), the device determines that the input is a tap-and-hold gesture on the first content item in the scrollable list of content (e.g., tap-and-hold gesture 663 in FIG. 6E), and, in response, displays the first note, as shown in FIGS. 6L-6M. For example, for an electronic device with a touch-sensitive display and one or more sensors to detect intensity of contacts with the touch-sensitive display, the device determines that the input is a stationary deep press gesture on the first content item in the scrollable list of content (e.g., deep press gesture 663 in FIG. 6E), and, in response, displays the first note, as shown in FIGS. 6L-6M.

In some embodiments, the device detects (726) an input on a first content item (e.g., a digital image) in the scrollable list of content, wherein the first content item is associated with a first note that also contains first electronic text content input by the user. For example, the first note includes the first electronic text content input by the user and the first content item. In some embodiments, the first note is displayed in a note view (e.g., FIG. 6A or FIGS. 6L-6M), but the first note is not displayed in the categorized-content view (e.g., FIG. 6D or FIGS. 6E-6G). In the note view, the first note is displayed with both the first electronic text content input by the user and the first content item. FIG. 6L, for example, shows the first note displayed with both electronic text content 696 input by the user and photo 672.

In accordance with a determination that the input is a first type of input, the device enlarges the first content item without displaying the first note (and, in some embodiments, ceases to display the scrollable list of content). For example, for an electronic device with a touch-sensitive display (e.g., touch screen 556), the device determines that the input is a tap gesture on the first content item in the scrollable list of content (e.g., tap gesture 663 in FIG. 6E), and, in response, enlarges the first content item without displaying the first note, as shown in FIG. 6J.

In accordance with a determination that the input is a second type of input, distinct from the first type of input, the device displays a menu with selectable actions for the first content item (and, in some embodiments, ceases to display the scrollable list of content). For example, for an electronic device with a touch-sensitive display (e.g., touch screen 556), the device determines that the input is a tap-and-hold gesture on the first content item in the scrollable list of content (e.g., tap-and-hold gesture 663 in FIG. 6E), and, in response, displays a menu with selectable actions that can be performed on the first content item (e.g., showing the corresponding note, sharing the first content item with others (e.g., via email or a messaging application), printing, copying, etc.), as shown in FIG. 6N. For example, for an electronic device with a touch-sensitive display and one or more sensors to detect intensity of contacts with the touch-sensitive display, the device determines that the input is a stationary deep press gesture on the first content item in the scrollable list of content (e.g., deep press gesture 663 in FIG. 6E), and, in response, displays a menu with selectable actions that can be performed on the first content item, as shown in FIG. 6N.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein.

Figure 8:
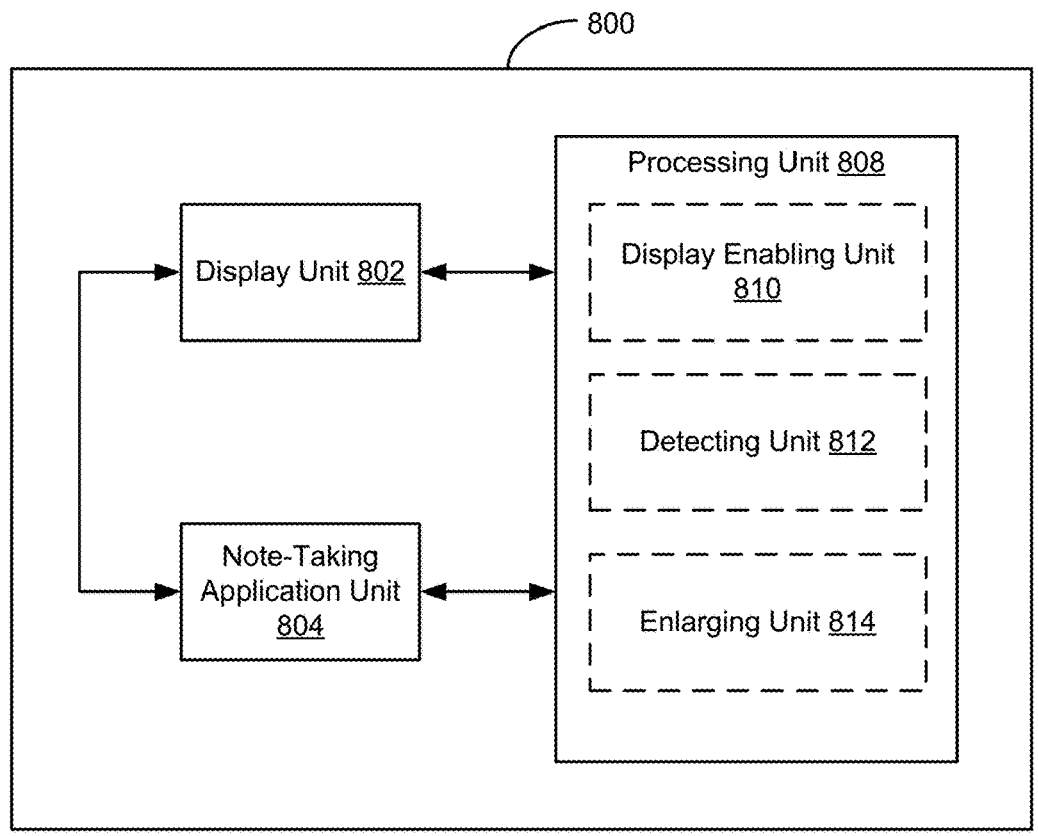
FIG. 8 is a functional block diagram of an electronic device in accordance with some embodiments.

In accordance with some embodiments, FIG. 8 shows a functional block diagram of an electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 includes a display unit 802 configured to display a user interface, a note-taking application unit 804 configured to take notes, and a processing unit 808 coupled with the display unit 802 and the note-taking application unit 804. In some embodiments, the processing unit 808 includes a display enabling unit 810, a detecting unit 812, and an enlarging unit 814. In some embodiments, device 800 optionally includes a touch-sensitive surface unit configured to receive user contacts (including stylus contacts) and optionally includes one or more sensor units configured to detect intensity of contacts with the touch-sensitive surface unit and/or configured to detect signals from a stylus associated with the device.

The processing unit 808 is configured to: enable display of, on the display unit 802, a first user interface of the note-taking application unit 804 (e.g., with the display enabling unit 810), wherein: the note-taking application unit 804 includes a plurality of notes prepared by a user; the plurality of notes prepared by the user includes electronic text content input by the user, and content created and/or selected by the user that is distinct from the electronic text content input by the user; the content created and/or selected by the user includes content from a plurality of distinct content categories; and the first user interface displays a categorized-content-view affordance; detect activation of the categorized-content-view affordance (e.g., with the detecting unit 812); and, in response to detecting activation of the categorized-content-view affordance, enable display of, in a categorized-content view, a scrollable list of at least some of the content created and/or selected by the user that is distinct from the electronic text content input by the user (e.g., with the display enabling unit 810), wherein the content in the scrollable list is organized and displayed by the content categories.

In some embodiments, the first user interface concurrently displays, with the categorized-content-view affordance, a first note prepared by the user of the electronic device.

In some embodiments, the first user interface concurrently displays the categorized-content-view affordance and the first note without displaying other notes prepared by the user in the note-taking application unit 804.

In some embodiments, the content categories in the scrollable list include hand-drawn sketches created by the user.

In some embodiments, the processing unit 808 is configured to: detect an input on a first content item in the scrollable list of content (e.g., with the detecting unit 812), wherein the first content item is associated with a first note that also contains first electronic text content input by the user; in accordance with a determination that the input is a first type of input, enlarge the first content item without enabling display of the first note (e.g., with the enlarging unit 814); and, in accordance with a determination that the input is a second type of input, distinct from the first type of input, enable display of the first note (e.g., with the display enabling unit 810).

In some embodiments, the processing unit 808 is configured to: detect an input on a first content item in the scrollable list of content (e.g., with the detecting unit 812), wherein the first content item is associated with a first note that also contains first electronic text content input by the user; in accordance with a determination that the input is a first type of input, enlarge the first content item without enabling display of the first note (e.g., with the enlarging unit 814); and, in accordance with a determination that the input is a second type of input, distinct from the first type of input, enable display of a menu with selectable actions for the first content item (e.g., with the display enabling unit 810).

In some embodiments, the categorized-content view displays, for a respective content category, a predefined number of content items in the respective content category, and an affordance for the respective content category that when activated results in the display of additional content items in the respective content category.

In some embodiments, the predefined number of content items in the respective content category are configured to be concurrently displayed on the display unit 802 at a same time.

In some embodiments, the predefined number of content items in the respective content category and the affordance for the respective content category are configured to be concurrently displayed on the display unit 802 at a same time.

In some embodiments, the content items displayed as part of the predefined number of content items in the respective content category correspond to the most recent content items created and/or selected by the user in the respective content category.

In some embodiments, the content items displayed as part of the predefined number of content items in the respective content category correspond to the most recently displayed content items in the respective content category.

The operations in the information processing methods described above are, optionally implemented by running one or more functional modules in information processing apparatus such as general purpose processors (e.g., as described above with respect to FIGS. 1A, 3, 5B, and 5D) or application specific chips.

The operations described above with reference to FIGS. 7A-7C are, optionally, implemented by components depicted in FIGS. 1A-1B or FIG. 8. For example, display operation 702, detection operation 708, and display operation 710 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with a display and a note-taking application:
displaying, on the display, a first user interface of the note-taking application, wherein:
the note-taking application includes notes prepared by a user;
each respective note of a plurality of the notes prepared by the user includes:
electronic text content input by the user, and
content of one or more embedded content items, concurrently displayed with at least a portion of the electronic text content input by the user, wherein the one or more embedded content items are created and/or selected by the user and are distinct from the electronic text content in the respective note;
the embedded content items in the plurality of notes are from a plurality of distinct content categories, comprising categories of embedded content, and each embedded content item is from a respective content category of the plurality of distinct content categories; and
the displayed first user interface includes a categorized-content-view affordance;
detecting activation of the categorized-content-view affordance;
in response to detecting activation of the categorized-content-view affordance, concurrently displaying, in a categorized-content view of the note-taking application, a scrollable view of content of at least one of the embedded content items from a first content category and content of at least one of the embedded content items from a second content category distinct from the first content category, wherein the embedded content items in the scrollable view are organized and displayed by the content categories;
detecting a touch input on a first embedded content item in the scrollable view, wherein a first note of the plurality of notes includes the first embedded content item and first electronic text content input by the user;
in accordance with a determination that the touch input on the first embedded content item is a first type of input, enlarging the first embedded content item without displaying the first note; and,
in accordance with a determination that the touch input on the first embedded content item is a second type of input, distinct from the first type of input, displaying a menu with selectable actions for the first embedded content item, wherein selection of one of the selectable actions results in display of the first note including the first embedded content item and the first electronic text content input by the user.

2. The method of claim 1, wherein displaying the first user interface includes concurrently displaying, with the categorized-content-view affordance, a second note prepared by the user of the electronic device; and displaying the second in the first user interface includes concurrently displaying, within the second note, content of one or more embedded content items of the second note and electronic text content of the second note.

3. The method of claim 2, wherein the embedded content items from the first and second content categories in the scrollable view include a plurality of embedded content items from the first content category of the plurality of distinct content categories, and the scrollable view does not include electronic text content input by the user.

4. The method of claim 1, wherein the content categories in the scrollable view include a distinct category for hand-drawn sketches.

5. The method of claim 1, including:
detecting a second input on a second embedded content item in the scrollable view, wherein a second note of the plurality of notes includes the second embedded content item and also includes second electronic text content input by the user;
in accordance with a determination that the second input is the first type of input, enlarging the second embedded content item without displaying the second note; and,
in accordance with a determination that the second input is a third type of input, distinct from the first type of input, displaying the second note.

6. The method of claim 1, wherein the categorized-content view includes, for a respective content category,
a predefined number of embedded content items in the respective content category, and
an affordance for the respective content category that when activated results in the display of additional embedded content items in the respective content category.

7. The method of claim 6, wherein the predefined number of embedded content items in the respective content category are configured to be concurrently displayed on the display at a same time.

8. The method of claim 6, wherein the predefined number of embedded content items in the respective content category and the affordance for the respective content category are configured to be concurrently displayed on the display at a same time.

9. The method of claim 6, wherein the embedded content items displayed as part of the predefined number of embedded content items in the respective content category are the most recent embedded content items created and/or selected by the user in the respective content category.

10. The method of claim 6, wherein the embedded content items displayed as part of the predefined number of embedded content items in the respective content category are the most recently displayed embedded content items in the respective content category.

11. The method of claim 1, wherein the embedded content items in the first content category comprise all content items in the first content category in the note-taking application.

12. An electronic device, comprising:
a display;
a note-taking application;
one or more processors;
memory; and
one or more programs, wherein the one or more programs are stored in the memory and configured to be executed by the one or more processors, the one or more programs including instructions for:
displaying, on the display, a first user interface of the note-taking application, wherein:
the note-taking application includes notes prepared by a user;
each respective note of a plurality of the notes prepared by the user includes:
electronic text content input by the user, and
content of one or more embedded content items, concurrently displayed with at least a portion of the electronic text content input by the user, wherein the one or more embedded content items are created and/or selected by the user that is distinct from the electronic text content in the respective note;
the embedded content items in the plurality of notes are from a plurality of distinct content categories, comprising categories of embedded content, and each embedded content item is from a respective content category of the plurality of distinct content categories; and
the displayed first user interface includes a categorized-content-view affordance;
detecting activation of the categorized-content-view affordance;
in response to detecting activation of the categorized-content-view affordance, concurrently displaying, in a categorized-content view of the note-taking application, a scrollable view of content of at least one of the embedded content items from a first content category and content of at least one of the embedded content items from a second content category distinct from the first content category, wherein the embedded content items in the scrollable view are organized and displayed by the content categories;
detecting a touch input on a first embedded content item in the scrollable view, wherein a first note of the plurality of notes includes the first embedded content item and first electronic text content input by the user;
in accordance with a determination that the touch input on the first embedded content item is a first type of input, enlarging the first embedded content item without displaying the first note; and,
in accordance with a determination that the touch input on the first embedded content item is a second type of input, distinct from the first type of input, displaying a menu with selectable actions for the first embedded content item, wherein selection of one of the selectable actions results in display of the first note including the first embedded content item and the first electronic text content input the user.

13. The electronic device of claim 12, wherein displaying the first user interface includes concurrently displaying, with the categorized-content-view affordance, a second note prepared by the user of the electronic device; and displaying the second note in the first user interface includes concurrently displaying, within the second note, content of one or more embedded content items of the second note and electronic text content of the second note.

14. The electronic device of claim 13, wherein the embedded content items from the first and second content categories in the scrollable view includes a plurality of embedded content items from the first content category of the plurality of distinct content categories, and the scrollable view does not include electronic text content input by the user.

15. The electronic device of claim 12, wherein the content categories in the scrollable view include a distinct category for hand-drawn sketches.

16. The electronic device of claim 12, wherein the one or more programs include instructions for:
detecting a second input on a second embedded content item in the scrollable view, wherein a second note of the plurality of notes includes the second embedded content item and also includes second electronic text content input by the user;
in accordance with a determination that the second input is the first type of input, enlarging the second embedded content item without displaying the second note; and,
in accordance with a determination that the second input is a third type of input, distinct from the first type of input, displaying the second note.

17. The electronic device of claim 12, wherein the categorized-content view includes, for a respective content category,
a predefined number of embedded content items in the respective content category, and
an affordance for the respective content category that when activated results in the display of additional embedded content items in the respective content category.

18. The electronic device of claim 17, wherein the predefined number of embedded content items in the respective content category are configured to be concurrently displayed on the display at a same time.

19. The electronic device of claim 17, wherein the predefined number of embedded content items in the respective content category and the affordance for the respective content category are configured to be concurrently displayed on the display at a same time.

20. The electronic device of claim 17, wherein the embedded content items displayed as part of the predefined number of embedded content items in the respective content category correspond to most recent embedded content items created and/or selected by the user in the respective content category.

21. The electronic device of claim 17, wherein the embedded content items displayed as part of the predefined number of embedded content items in the respective content category correspond to most recently displayed embedded content items in the respective content category.

22. The electronic device of claim 12, wherein the embedded content items in the first content category comprise all content items in the first content category in the note-taking application.

23. A non-transitory computer readable storage medium storing one or more programs, the one or more programs comprising instructions, which when executed by an electronic device with a display and a note-taking application, cause the electronic device to:
  display, on the display, a first user interface of the note-taking application, wherein:
    the note-taking application includes notes prepared by a user;
    each respective note of a plurality of the notes prepared by the user includes:
      electronic text content input by the user, and
      content of one or more embedded content items, concurrently displayed with at least a portion of the electronic text content input by the user, wherein the one or more embedded content items are created and/or selected by the user and are distinct from the electronic text content in the respective note;
    the embedded content items in the plurality of notes are from a plurality of distinct content categories, comprising categories of embedded content, and each embedded content item is from a respective content category of the plurality of distinct content categories; and
    the displayed first user interface includes a categorized-content-view affordance;
  detect activation of the categorized-content-view affordance; and,
  in response to detecting activation of the categorized-content-view affordance, concurrently display, in a categorized-content view of the note-taking application, a scrollable view of content of at least one of the embedded content items from a first content category and content of at least one of the embedded content items from a second content category distinct from the first content category, wherein the embedded content items in the scrollable view are organized and displayed by the content categories;
  detect a touch input on a first embedded content item in the scrollable view, wherein a first note of the plurality of notes includes the first embedded content item and first electronic text content input by the user;
  in accordance with a determination that the touch input on the first embedded content item is a first type of input, enlarge the first embedded content item without displaying the first note; and,
  in accordance with a determination that the touch input on the first embedded content item is a second type of input, distinct from the first type of input, display a menu with selectable actions for the first embedded content item, wherein selection of one of the selectable actions results in display of the first note including the first embedded content item and the first electronic text content input the user.

24. The non-transitory computer readable storage medium of claim 23, wherein displaying the first user interface includes concurrently displaying, with the categorized-content-view affordance, a second note prepared by the user of the electronic device; and displaying the second note in the first user interface includes concurrently displaying, within the second note, content of one or more embedded content items of the second note and electronic text content of the second note.

25. The non-transitory computer readable storage medium of claim 24, wherein the embedded content items from the first and second content categories in the scrollable view include a plurality of embedded content items from the first content category of the plurality of distinct content categories, and the scrollable view does not include electronic text content input by the user.

26. The non-transitory computer readable storage medium of claim 23, wherein the content categories in the scrollable view include a distinct category for hand-drawn sketches.

27. The non-transitory computer readable storage medium of claim 23, wherein the one or more programs include instructions, which when executed by the electronic device, cause the electronic device to:
  detect a second input on a second embedded content item in the scrollable view, a second note of the plurality of notes includes the second embedded content item and also includes second electronic text content input by the user;
  in accordance with a determination that the second input is the first type of input, enlarge the second embedded content item without displaying the second note; and,
  in accordance with a determination that the second input is a third type of input, distinct from the first type of input, display the second note.

28. The non-transitory computer readable storage medium of claim 23, wherein the categorized-content view includes, for a respective content category,
  a predefined number of embedded content items in the respective content category, and
  an affordance for the respective content category that when activated results in the display of additional embedded content items in the respective content category.

29. The non-transitory computer readable storage medium of claim 28, wherein the predefined number of embedded content items in the respective content category are configured to be concurrently displayed on the display at a same time.

30. The non-transitory computer readable storage medium of claim 28, wherein the predefined number of embedded content items in the respective content category and the affordance for the respective content category are configured to be concurrently displayed on the display at a same time.

31. The non-transitory computer readable storage medium of claim 28, wherein the embedded content items displayed as part of the predefined number of embedded content items in the respective content category are the most recent embedded content items created and/or selected by the user in the respective content category.

32. The non-transitory computer readable storage medium of claim 28, wherein the embedded content items displayed as part of the predefined number of embedded content items in the respective content category are the most recently displayed embedded content items in the respective content category.

33. The non-transitory computer readable storage medium of claim 23, wherein the embedded content items in the first content category comprise all content items in the first content category in the note-taking application.

* * * * *